US007099024B2

(12) United States Patent
Yagi

(10) Patent No.: US 7,099,024 B2

(45) Date of Patent: Aug. 29, 2006

(54) RECORDING POSITION ADJUSTING PATTERN FORMING METHOD, IMAGE RECORDING POSITION ADJUSTING METHOD AND IMAGE RECORDING APPARATUS

(75) Inventor: Keiichi Yagi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 934 days.

(21) Appl. No.: 10/010,859

(22) Filed: Dec. 7, 2001

(65) Prior Publication Data

US 2003/0020930 A1 Jan. 30, 2003

(30) Foreign Application Priority Data

Jul. 27, 2001 (JP) ............................ 2001-228638

(51) Int. Cl.
*G06F 15/00* (2006.01)

(52) U.S. Cl. ...................... 358/1.14; 358/1.8; 358/504; 347/19

(58) Field of Classification Search ............... 358/1.14, 358/504, 1.8; 347/19
See application file for complete search history.

(56) References Cited

U.S. PATENT DOCUMENTS

| | | | | |
|---|---|---|---|---|
| 4,878,063 | A | 10/1989 | Katerberg | |
| 6,109,722 | A * | 8/2000 | Underwood et al. | 347/19 |
| 6,164,745 | A * | 12/2000 | Nagoshi et al. | 347/15 |
| 6,322,191 | B1 * | 11/2001 | Seshimo et al. | 347/19 |
| 6,454,390 | B1 * | 9/2002 | Takahashi et al. | 347/41 |
| 6,532,026 | B1 * | 3/2003 | Takahashi et al. | 347/41 |
| 6,554,387 | B1 * | 4/2003 | Otsuki | 347/19 |
| 6,906,832 | B1 * | 6/2005 | Furukawa et al. | 358/480 |

* cited by examiner

*Primary Examiner*—Joseph R. Pokrzywa
*Assistant Examiner*—Mark R. Milia
(74) *Attorney, Agent, or Firm*—Fildes & Outland, P.C.

(57) ABSTRACT

A method for forming a recording position adjusting pattern that is capable of correcting a recording position correctly, a method for adjusting the image recording position, and an image recording apparatus are provided. Corrected K color parallel bars are grouped into blocks each of which includes a certain number of bars and plural blocks are printed in block (180, 188), and the color parallel bars are printed between the K color parallel bars with tilt magnitude that is different for every block (182, 190). The optical detection unit detects the block having the highest density among the printed parallel bars (184, 192), the tilt magnitude of the detected block is set as the tilt magnitude of the color to thereby correct the tilt of the color (186, 194). The tilt of each color is corrected in the same manner.

18 Claims, 21 Drawing Sheets

RECORDING POSITION ADJUSTING PATTERN FORMING METHOD, IMAGE RECORDING POSITION ADJUSTING METHOD AND IMAGE RECORDING APPARATUS

BACKGROUND OF THE INVENTION

1. Field of the Invention

This invention relates to a recording position adjusting pattern forming method, an image recording position adjusting method and an image recording apparatus, and more particularly relates to a recording position adjusting pattern forming method, an image recording position adjusting method and an image recording apparatus to be used for correction of the image displacement due to the recording position displacement between plural recording heads of an image recording apparatus on which plural recording heads are mounted.

2. Description of the Related Art

The mechanical fixing error of the fix position and fix attitude of heads that are arranged in parallel on a carriage causes the inclined printing of horizontal rules due to the printing position displacement between the heads and displacement of fixed angle to the scanning direction of a carriage.

To correct the printing position, the electric delay is properly applied to the printing signal that is applied to the heads so as to offset the error due to mechanical fixing or printing characteristic difference between the heads. Thereby, it is possible to correct the printing position.

At that time, for checking the proper adjustment magnitude of the electric delay, the delay detection is checked visually or automatically by means of an optical detection unit by use of a test pattern that is printed with a predetermined successive displacement of the electric delay to thereby detect the displacement magnitude of the parallel pattern included in the pattern or to detect the average density of the pattern. As the result, it is possible to correct the printing position properly.

Various methods for detection and correction of the fixing angle to the recording head (inclination of a head) and the printing position have been proposed. For example, Japanese Published Unexamined Patent Application No. Hei 11-99643 discloses a method in which a predetermined pattern is recorded by use of respective right and left heads to detect the printing position displacement between plural recording heads. At that time, the pattern of the one head is recorded with displacement of a predetermined magnitude and without displacement, the recorded result of the pattern is read by use of a sensor and the density of the pattern is compared to detect the recording position displacement.

For example, Japanese Published Unexamined Patent Application No. Hei 7-17076 discloses a technical method as a pattern to detect printing displacement in which an adjusting pattern having plural vertical rules of at least three lines, the relative position of which three lines is slightly displaced in the carrier scanning direction of the lines of the odd number line and the even number line, is printed, and the coincidence of the vertical rule on two lines and the coincidence of the vertical rule on three or more lines that form an approximate straight line with the whole vertical line is identified visually, the inclination of the printing is calculated, and the inclination is adjusted.

For example, Japanese Published Examined Utility Model Hei 3-8448 and U.S. Pat. No. 4,878,063 disclose the adjusting pattern of the horizontal line for visual adjustment, and furthermore the Japanese Published Unexamined Patent Application No. Hei 10-264485 discloses a method in which parallel line pattern is used as the adjusting pattern for visual adjustment.

Furthermore, for example, Japanese Published Unexamined Patent Application No. Hei 7-178964 and Japanese Published Unexamined Patent Application No. Hei 8-90835 disclose the printing pattern and a recording apparatus for adjusting the printing position of a reciprocal recording head.

In the case where a detection pattern is formed with a color monochrome and, in particular, the average density of the pattern is detected automatically by use of an optical unit, the sensitivity of C (cyan) or Y (yellow) is not sufficient due to the spectral characteristics of the optical detection unit, it is difficult to detect the density difference of the monochrome pattern, and a light source having the different spectral characteristics is required.

The parallel pattern is displaced by a predetermined magnitude from the proper value because of the structure of the pattern, a space appears on the pattern, and the average density is lowered. According to the method described hereinabove, though the density difference can be detected, the patterns (parallel bars) overlap each other in the magnitude equal to the caused space. Because the lower density color (low sensitivity) results in the higher density of the overlap area, the caused space and the density increase of the overlap area are offset each other to prevent the detection of the average density difference.

Because the density absolute value of the monochrome pattern is low (that is, the reflectance is high), in the case where the luminance of a light source is increased to enlarge the density difference, the output of a light receiving element is saturated and the luminance cannot be increased resultantly.

In the case of visual detection, the density difference or pattern displacement of Y is difficult to be recognized.

The present invention has been accomplished to solve the above-mentioned problem, and provides a method for forming recording position adjusting pattern, and an image recording position adjusting method and an image recording apparatus that are capable of correction of the recording position correct precisely.

SUMMARY OF THE INVENTION

To solve the problem described hereinabove, the present invention has been accomplished to provide a recording position adjusting pattern forming method for adjusting a recording position of plural recording heads of different colors for recording a color image on a recording medium characterized in that a recording head of a predetermined color is assigned as a reference recording head among the plural recording heads, the reference recording head is adjusted so as to form a predetermined reference pattern, plural reference parallel bars are recorded on the recording medium, and plural parallel bars are recorded with different inclination respectively on the recording medium by use of a recording head other than the reference recording head between the plural reference parallel bars with overlapping to form a recording position adjusting pattern.

According to the present invention, the reference head is adjusted so as to form a predetermined reference pattern (for example, reference parallel bars with corrected inclination of the reference recording head), plural reference parallel bars are recorded on a recording medium, and the plural bars with different inclination are recorded between the recorded plural reference parallel bars with overlapping by use of another recording head. In detail, the plural parallel bars recorded by means of another recording head are recorded so that the inclination of the parallel bars is different respectively with respect to the reference parallel bars, the inclination of the parallel bar with the smallest inclination is detected among the recorded recording position adjusting patterns, and the detected inclination is regarded as the correction value. As the result, it is possible that the inclination of the image recorded by means of the reference recording head is matched correctly with the inclination of the image recorded by means of another recording head.

By adjusting the recording position due to the inclination of the reference recording head previously, the inclination of other recording heads is adjusted as described hereinabove to thereby correct the recording position due to the inclination of all the recording heads more correctly.

The reference recording head records plural blocks each of which includes plural reference parallel bars and another recording head records plural blocks each of which includes plural parallel bars, and the parallel bars with different inclination for every block are recorded. Thereby, the parallel bars recorded by means of a recording head other than the reference recording head have different inclination for every block. As the result, the smallest inclination is detected for each block, and it is possible to detect the inclination correction value (degree of inclination) correctly.

The black recording head for recording a black image is assigned as the reference recording head and the reference parallel bars are black. Because the parallel bars recorded by means of another recording head (for example, a different color such as cyan, magenta, yellow) with different inclination are overlapped on the black reference parallel bars, it is possible to detect the density change based on a moiré formed by overlapping of black and another color. As the result, it is possible to correct the recording position due to inclination of the recording head by detecting the density by means of the optical detection unit.

Otherwise, a method may be employed in which the inclination of the reference parallel bars due to inclination of the reference recording head is adjusted, the recording position in a scanning direction of the recording head between the respective recording heads of the plural recording heads is adjusted, and a recording position due to inclination caused between plural recording head is adjusted.

The inclination of the reference parallel bars due to inclination of the reference recording head is adjusted, the recording position in the scanning direction of the recording head between recording heads is adjusted (color displacement correction) between plural recording heads, and the inclination of the parallel bar with the smallest inclination is regarded as the correction value to thereby adjust the recording position due to inclination caused between the plural recording heads. In other words, the recording position due to inclination of the reference recording head is adjusted previously, and the recording position in the scanning direction between recording heads is adjusted. Thereby, the inclination of each recording head is adjusted with aid of the reference recording head as the reference by use of the above-mentioned recording position adjusting pattern. As the result, the inclination caused between all the recording heads can be corrected correctly.

Furthermore, the present invention provides an image recording apparatus including plural recording heads for recording images of different colors respectively on a recording medium, a recording control unit that controls the reference recording head of the reference color for the plural recording heads to record plural reference parallel bars on the recording medium and controls a recording head other than the reference recording head to record plural parallel bars with different inclination respectively on the recording medium between the reference parallel bars with overlapping to thereby record a recording position adjusting pattern on the recording medium, an optical detection unit that optically detects the recording position adjusting pattern recorded by means of the recording control unit, and a recording timing adjusting unit that adjusts a recording timing of the plural recording heads of the recording control unit based on a detected output of the optical detection unit.

The plural recording heads form a color image on a recording medium. The recording control unit controls the reference recording head of the color to be used as the reference to record plural reference parallel bars on the recording medium, and controls another recording head so that plural parallel bars with different inclination recorded by means of another recording head is overlapped on the reference parallel bars. As the result, the recording position adjusting pattern can be formed on the recording medium.

The optical detection unit detects, for example, the density change of the recording position adjusting pattern formed on the recording medium, and the recording timing adjusting unit adjusts the recording timing of the recording head so that the inclination of the parallel bar with the highest (or lowest) inclination of the detected average density is regarded as the correction value of the recording head that has recorded the parallel bar to equalize the inclination of the parallel bars. Thereby, the inclination of another recording head can be equalized to the inclination of the reference recording head.

Herein, the inclination of the reference recording head has been adjusted previously, and this inclination is applied to all the recording heads to correct the inclination. Thereby, the recording position due to inclination of the recording head can be adjusted correctly.

The black printing recording head for recording black image is assigned as the reference recording head and the black parallel bars are resultantly assigned as the reference parallel bars. Parallel bars recorded by means of another recording head with different inclination (for example, another color, namely cyan, magenta, or yellow) are overlapped on the black reference parallel bars. Thereby, it is possible to detect the density change based on a moiré caused by overlapping the black on another color. As the result, it is possible to adjust the recording position due to the inclination of the recording head by detecting the density by means of the optical detection unit of a monochrome light source.

Furthermore, a method may be employed in which the optical detection unit detects the recording position adjusting pattern on a downstream side of an image recording direction in a direction that intersects with a scanning direction of the plural recording heads. By employing the method described hereinabove, the optical detection unit can start detecting when the recording of the parallel bars is completed, and it is possible to detect the recording position displacement.

Furthermore, an operation starting instruction unit and an automatic execution control unit 23 that automatically operates the recording control unit, the optical detection unit, and a recording timing adjusting unit based on an operation starting instruction supplied from the operation starting instruction unit may be provided. The automatic execution control unit 23 may be a switch provided on the image recording apparatus or the instruction may be one supplied from a computer that controls the image forming apparatus. The present invention can be applied to a method for forming a recording position adjusting pattern, in which plural reference parallel bars are recorded by use of the recording head of the predetermined color among independent recording heads for recording plural colors respectively to be used to record a color image on a recording medium and plural parallel bars with different inclination respectively are recorded between the bars of the reference parallel bars by use of a recording head other than the recording head described hereinabove. Furthermore, the present invention may be applied as a method for detecting a recording position adjusting pattern, in which reference plural parallel bars are recorded by use of the recording head of the predetermined color among independent recording heads for recording plural colors respectively to record a color image on a recording medium and plural parallel bars with different inclination respectively are recorded between the bars of the reference parallel bars by use of a recording head other than the recording head described hereinabove, and the recorded parallel bars are detected optically.

The optical detection is preferable for detecting the reflection density of the parallel bars. Furthermore, the present invention may be applied as a method for aligning plural recording heads, in which plural reference parallel bars are recorded by use of the recording head of the predetermined color among independent recording heads for recording plural colors respectively to record a color image on a recording medium and plural parallel bars with different inclination respectively are recorded between the bars of the reference parallel bars by use of a recording head other than the recording head described hereinabove, the recorded parallel bars are detected optically and the recording timing of the recording head is adjusted based on the detected result. In this case, the recording of the reference parallel bars, the recording of the plural parallel bars with different inclination, the optical detection, and the recording timing adjustment can be executed automatically, and the load on a user is mitigated.

Furthermore, the present invention can be applied as an image recording apparatus provided with an auto-alignment mode for automatically executing an operation comprising a step in which plural reference parallel bars are recorded on a recording medium by use of a recording head of a color that is predetermined previously among independent recording heads of plural colors that are used to record a color image on the recording medium, plural parallel bars with different inclination respectively are recorded between adjacent bars of the reference parallel bars by use of a recording head other than the recording head described hereinabove, the recorded parallel bars are detected optically, and a recording timing of the recording head is adjusted based on the detection result. Automatic execution mode may include recording position adjustment between the plural recording heads concomitant with reciprocation printing of a carriage movement in the horizontal direction and the vertical direction with respect to the carriage moving direction.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

One example of an embodiment of the present invention will be described in detail hereinafter with reference to the drawings.

Figure 1:
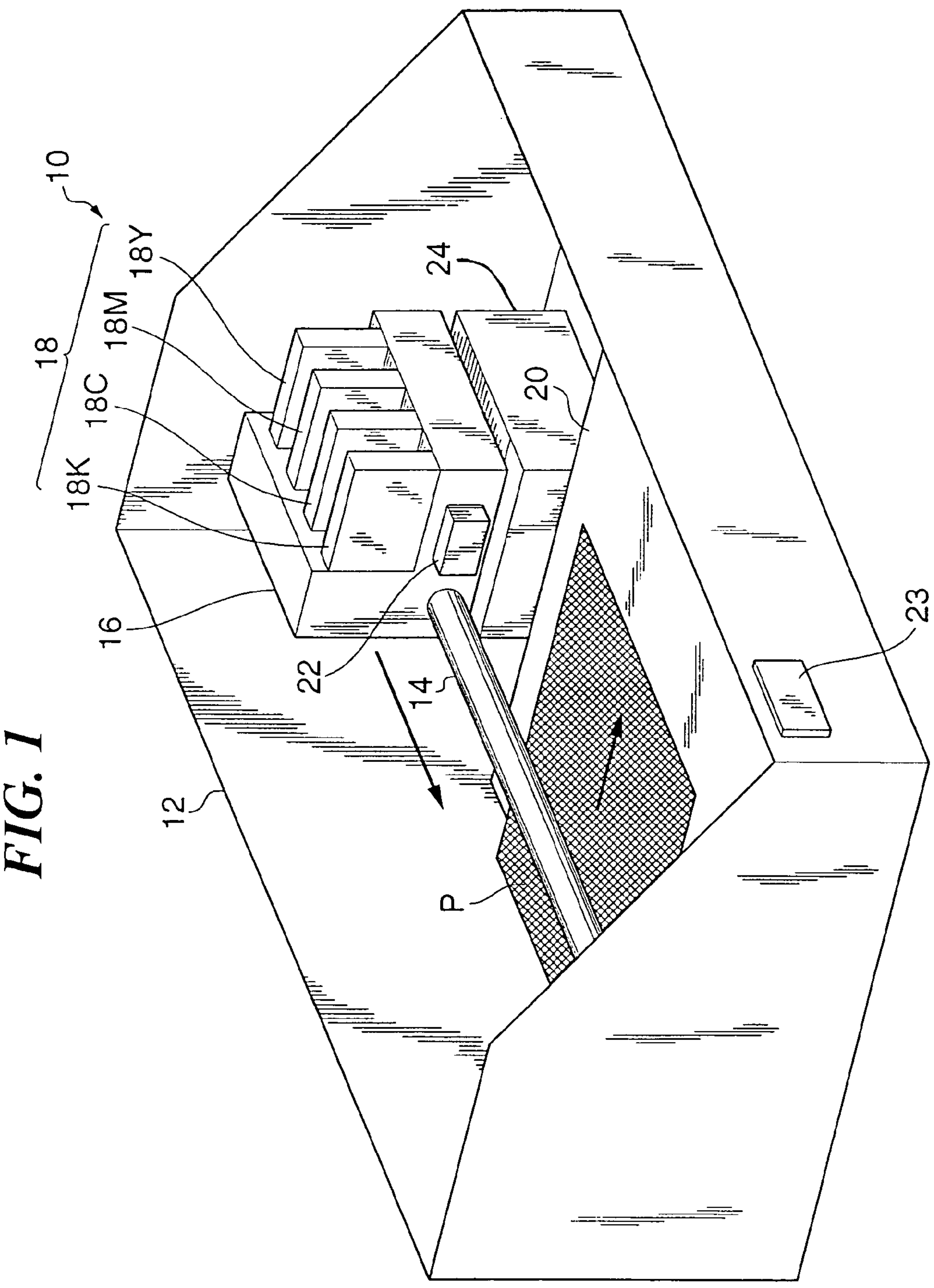
FIG. 1 is a perspective view showing the schematic structure of a color printer in accordance with an embodiment of the present invention.

FIG. 1 is a schematic structure of a color printer 10 in accordance with an embodiment of the present invention. The color printer 10 is provided with a rod 14 and a carriage 16 that moves along the rod 14 in a box 12 as shown in FIG. 1. The carriage 16 is provided detachably with color printing (recording) heads 18 that are served for printing the color corresponding to CMYK colors respectively (K printing head 18K, C printing head 18C, M printing head 18M, and Y printing head 18Y), and the carriage 16 moves along the rod to record in the fast-scanning direction.

Furthermore, the color printer 10 is provided with a platen 20 on which paper P that is served as a print medium, and the paper P is moved on the platen 20 in the direction perpendicular to the fast-scanning direction of the carriage 16 to carry out recording in the slow-scanning direction.

Figure 2:
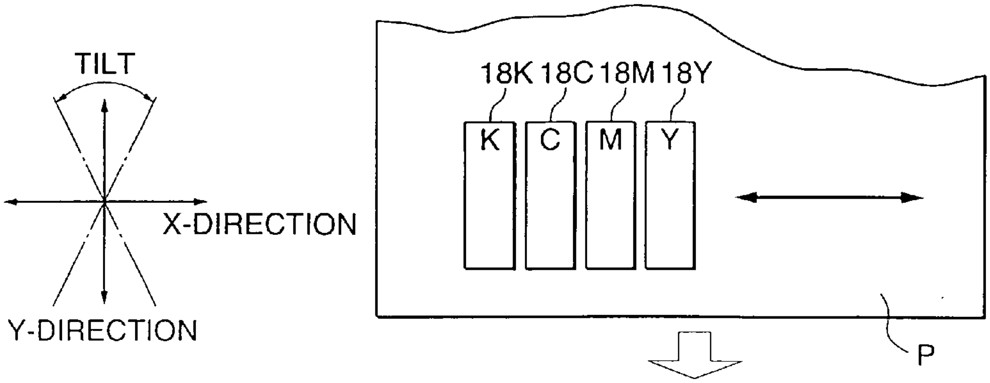
FIG. 2 is a diagram showing the arrangement of printing heads for respective colors.

In detail, color inks of the respective color printing heads 18 mounted on the carriage 16 are ejected to form an image in the fast-scanning direction while the carriage 16 is being scanned in the fast-scanning direction along the rod 14. An image is formed on the whole area or partial area of the recording area formed on paper P on the platen 20 that is defined by the respective nozzle bank lengths (slow-scanning direction) of the color printing head 18 and the scanning length of the carriage. The paper P is moved a certain distance corresponding to the length of the image formed in the slow-scanning direction and the image is formed in the fast scanning direction again, and the image is formed on the entire area of the paper P by repeating the image forming in the fast scanning direction and paper moving in the slow-scanning direction alternately. The respective color printing heads 18 are disposed in the order from K, to C, M, and Y along the scanning direction of the carriage 16 as shown in FIG. 1 and FIG. 2, but the order is by no means limited to the order shown in FIG. 1 and FIG. 2.

Furthermore, an optical detection unit 22 is provided at the position on the downstream side in the paper moving direction of the carriage 16, and the optical detection unit 22 scans concomitantly with scanning of the carriage 16. The optical detection unit 22 is provided with a light projecting part and light receiving part though not shown in the drawings, the light projecting part supplies light onto paper and the light receiving part receives the light reflected from the paper P. Thereby, the density of the image recorded on the paper P is detected optically.

Furthermore, a maintenance unit 24 provided for maintaining each color printing head 18 outside the recording area in the scanning direction of the carriage 16, and a waiting position of the carriage 16 is set at the position where the maintenance unit 24 is engaged with the color printing heads 18.

Next, the control system of the color printer 10 in accordance with the embodiment of the present invention will be described with reference to a block diagram shown in FIG. 3.

Figure 3:
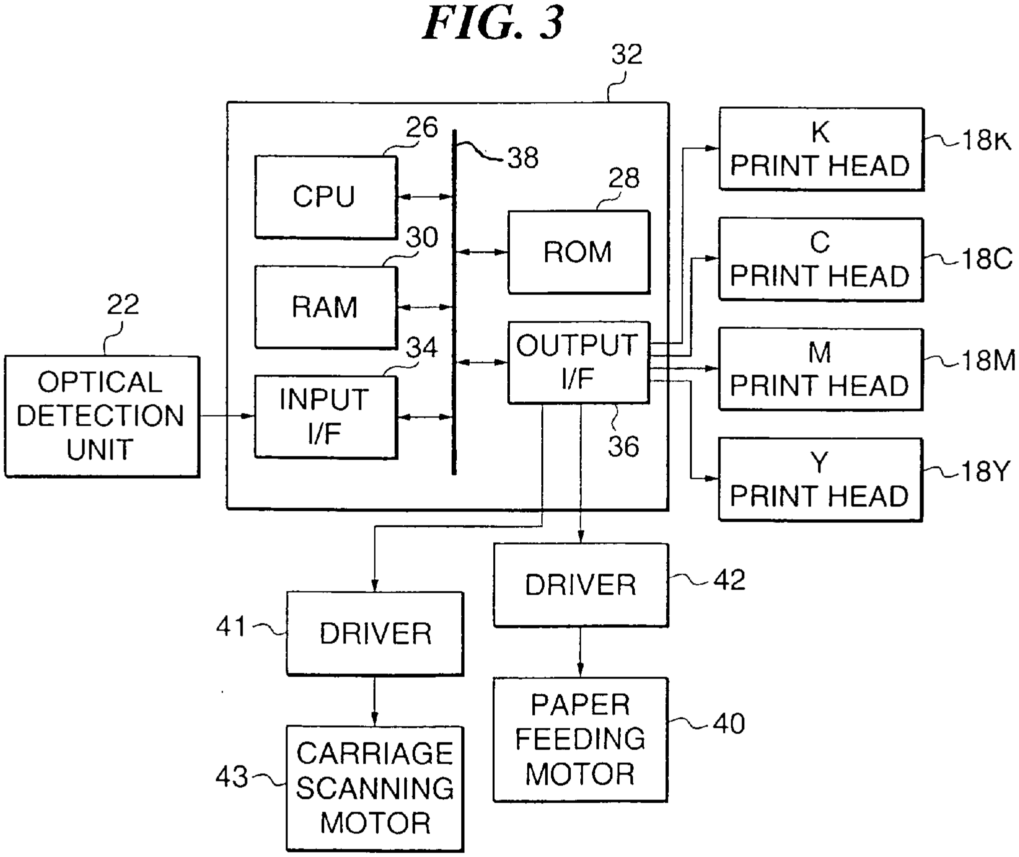
FIG. 3 is a block diagram showing a control system of the color printer in accordance with the embodiment of the present invention.

As shown in FIG. 3, the operation of the color printer 10 is controlled by means of a microcomputer 32 provided with a CPU 26, a ROM 28, a RAM 30, and peripheral devices.

The CPU 26, ROM 28, RAM 30, an input interface (input I/F) 34, and an output interface (output I/F) 36 of the microcomputer 32 are connected to a bus 38, and the input I/F 34 is connected to the optical detection unit 22. A signal detected by means of the optical detection unit 22 that indicates the density of the image recorded on the paper P is supplied to the microcomputer 32.

The output I/F 36 is connected to a driver 42 for driving a feeding motor 40 that is served to feed the paper P and a driver 41 for driving a carriage scanning motor 43 that is served to move the carriage 16. The feeding motor 40 and the carriage scanning motor 43 are controlled in response to the instruction supplied from the microcomputer 32.

Furthermore, the output I/F 36 is connected to the respective printing heads 18 (K printing head 18K, C printing head 18C, M printing head 18M, and Y printing head 18Y), and the ejection of ink from each printing head 18 is controlled by means of the microcomputer 32.

Figure 4:
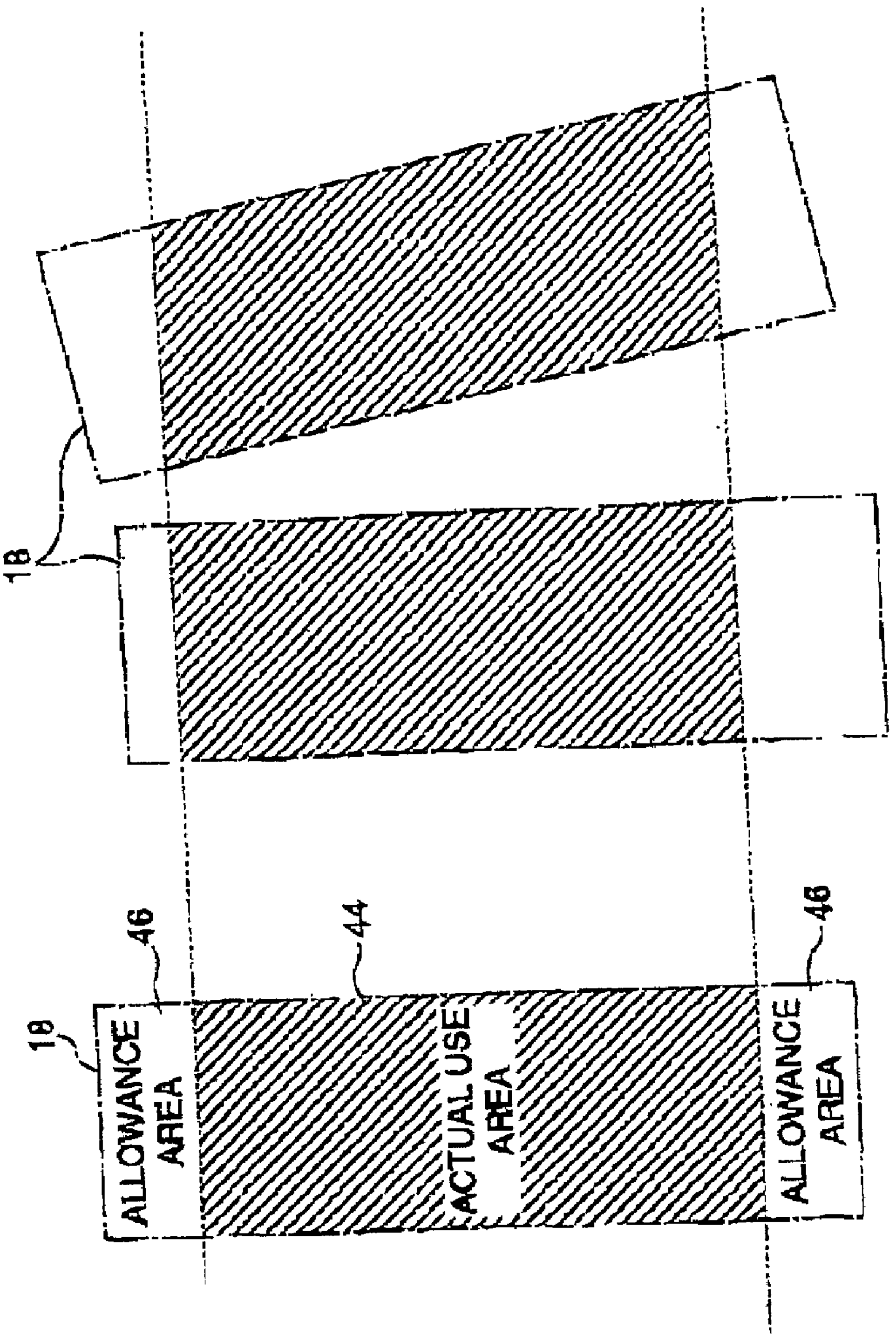
FIG. 4 is a diagram for describing a recording area of a printing head.

The ink ejection control of the color printing heads 18 is described hereunder. For example, the ink ejection timing of plural ink ejection nozzles of the respective printing heads 18 is controlled to control the image recording position in the scanning direction of the carriage 16. An actual use area 44 and an allowance area 46 to be actually used are set as shown in FIG. 4 for plural ink ejection nozzles of the respective printing heads 18, and the actual use area 44 is controlled to control the image recording position in the feeding direction of the paper P. Furthermore, the control of the ejection timing and the control of the actual use area 44 are controlled simultaneously to thereby correct the inclination of the printing head.

Subsequently, the image displacement detection adjustment in the color printer 10 having the structure described hereinabove will be described with reference to a flowchart shown in FIG. 5.

Herein, as shown in FIG. 2, a case in which the scanning direction of the carriage 16 is assigned as X-direction (horizontal direction), the paper feeding direction is assigned as Y-direction (vertical direction) and the inclination to Y-direction is assigned as tilt will be described for the purpose of description.

At first, K color parallel bars are printed for K color tilt correction in step 100. The K color tilt is corrected according to the flowchart shown in FIGS. 6A and 6B.

Figure 7:
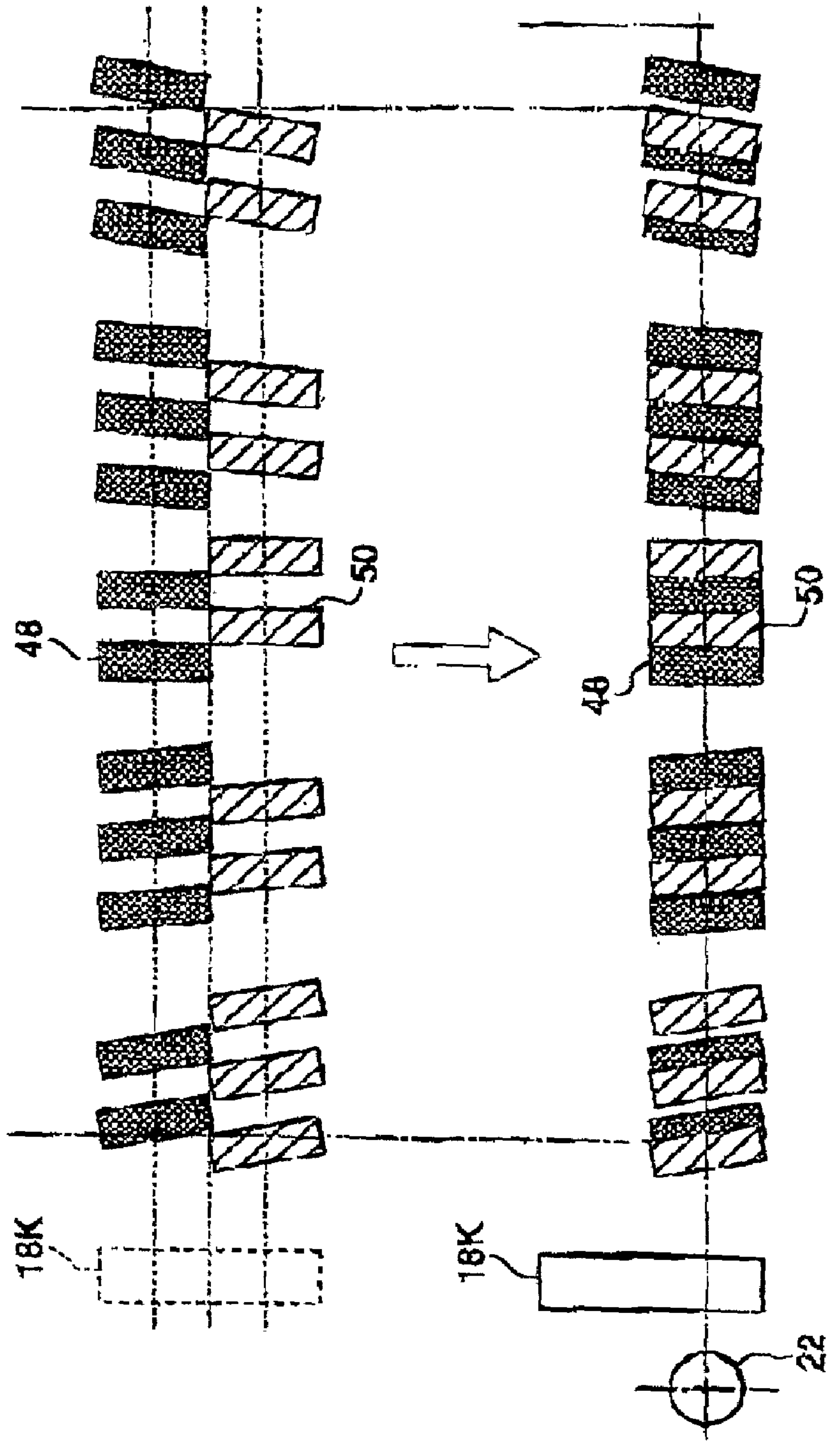
FIG. 7 is a diagram for describing the K color tilt correction.
Figure 8A:
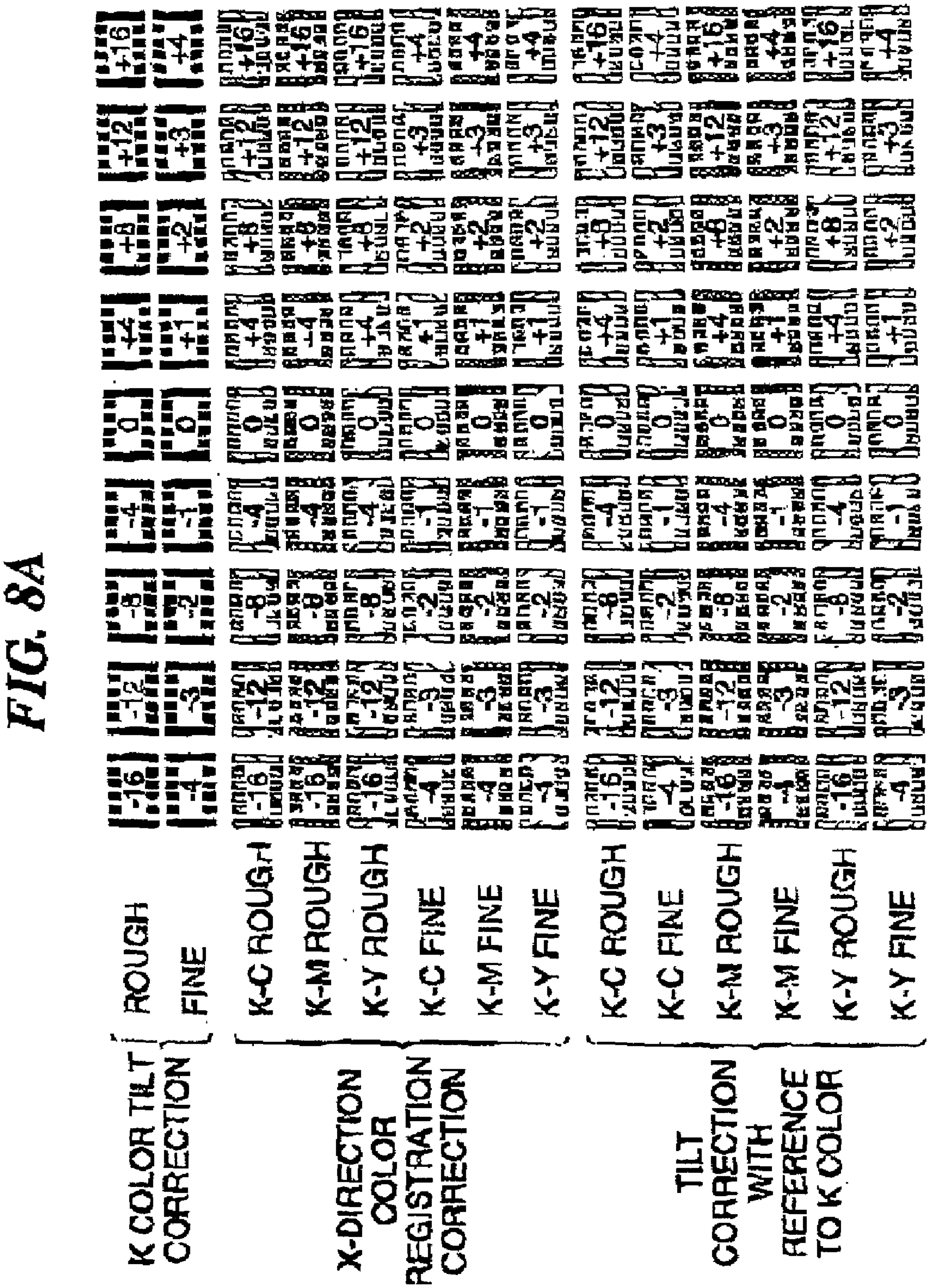
FIGS. 8A and 8B are a diagram showing a series of flow of the image displacement detection adjustment.
Figure 8B:
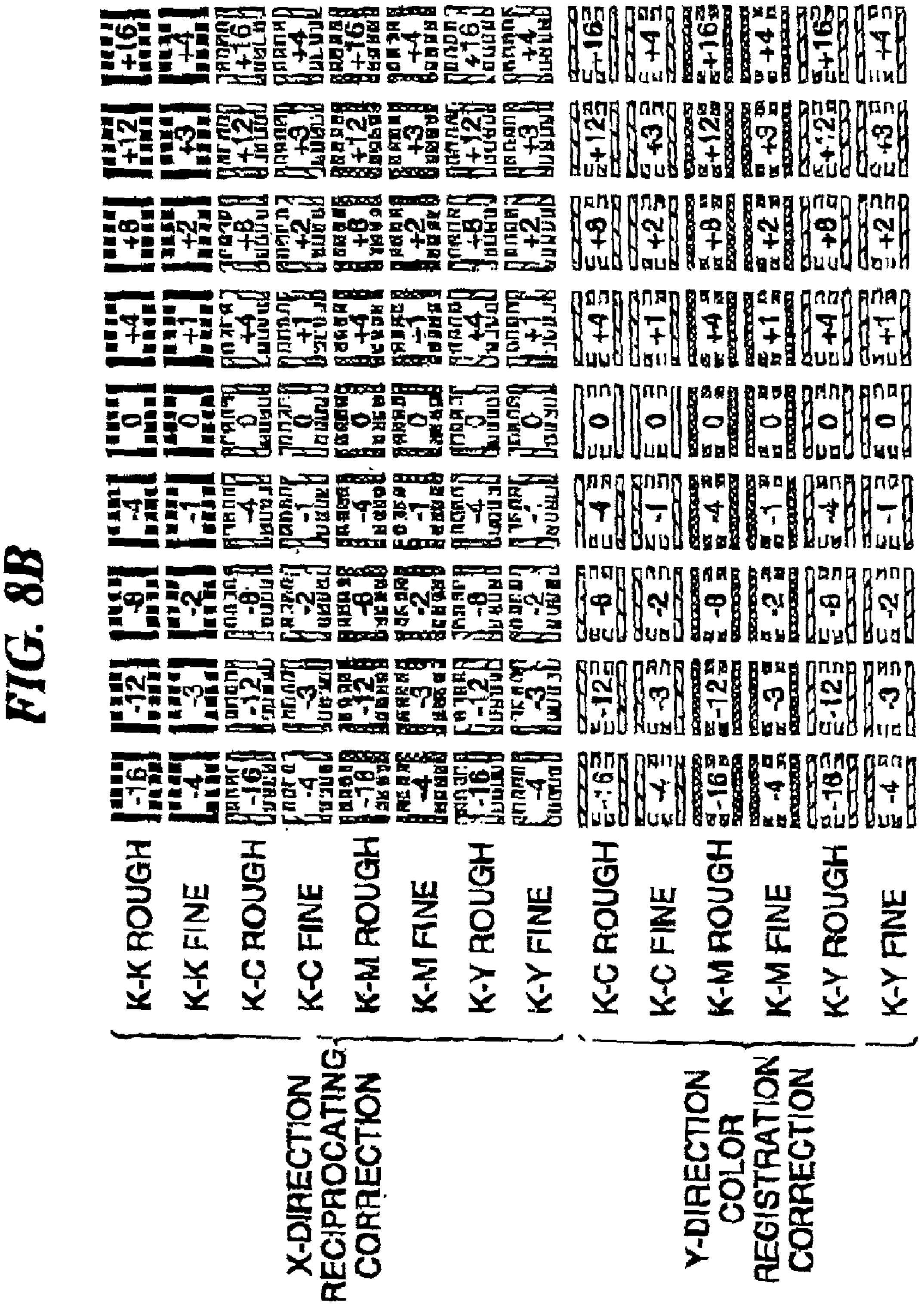

In detail, plural parallel bars 48 extending in Y-direction are printed along X-direction as shown in the upper part in FIG. 7 by use of the upstream side nozzle of the K printing head 18K. The printing interval between parallel bars 48 is equal to the printing interval of the parallel bars 48 in X-direction (step 120). At that time, the plural parallel bars 48 are grouped to form blocks each of which includes a predetermined number of bars, and blocks are printed with tilt of 4 dots successively for each block as the parallel bars 48. The tilt blocks are printed so as to have the median at the present state and so as to tilt 4 dots each in the positive and negative direction, and the span of adjustable range is ±16 dots as shown in FIGS. 8A and 8B.

Subsequently, the paper P is moved in Y-direction so that the nozzle located on the downstream side of the K printing head 18K is positioned at the position of the parallel bars 48 printed by the upstream side nozzle of the K printing head 18K (step 122). The parallel bars 50 are printed between the parallel bars 48 printed by the upstream side nozzle as shown in the lower row of FIG. 7 by use of the downstream side nozzle with 4-dot tilt for each block as in the case of the parallel bars 48 printed by the upstream side nozzle (step 124). The density of the parallel bars 48 and 50 printed as described hereinabove is detected by means of the optical detection unit 22 mounted on the carriage 16 (step 126), the block having the highest average density is detected, and the tilt magnitude of the block is set as the temporary tilt magnitude of K color (step 128).

Furthermore, plural parallel bars 48 are printed along X-direction by use of the K color upstream side nozzle as in the case of step 120 (step 130). At that time, the parallel bars 48 are grouped into blocks each of which includes a predetermined number of parallel bars and each block is printed in block with one dot tilt for each block as the parallel bars 48. The tilt blocks are printed so as to have the median at temporary tilt magnitude set in step 128 and so as to tilt 1 dot each in the positive and negative direction, and the span of adjustable range is ±4 dots as shown in FIGS. 8A and 8B.

Subsequently, the paper P is moved in Y-direction so that the downstream side nozzle of the K printing head 18K is positioned at the position of the parallel bars 48 printed with the temporary tilt magnitude by means of the upstream side nozzle of the K printing head 18K (step 132). The parallel bars 50 are printed between the parallel bars 48 printed by the upstream side nozzle by use of the downstream side nozzle with 1 dot tilt for each block as in the case of the parallel bars 48 printed by the upstream side nozzle (step 134). The density of the parallel bars 48 and 50 printed as described hereinabove is detected by means of the optical detection unit 22 mounted on the carriage 16 (step 136), the block having the highest average density is detected, and the tilt magnitude of the block is set as the temporary tilt magnitude of K color. The set tilt magnitude is corrected when the data is expanded to correct the tilt of K color (step 138). For example, it is possible that the printing timing is changed corresponding to the set tilt magnitude or printing data is replaced to thereby correct tilt.

As described hereinabove, in K color tilt correction processing as shown in FIG. 8, the rough adjustment for every 4 dots is performed and the fine adjustment for every 1 dot is performed thereafter to correct K color tilt. In other words, the number of patterns to be recorded on paper is reduced by correcting K color tilt stepwise.

Figure 9A:
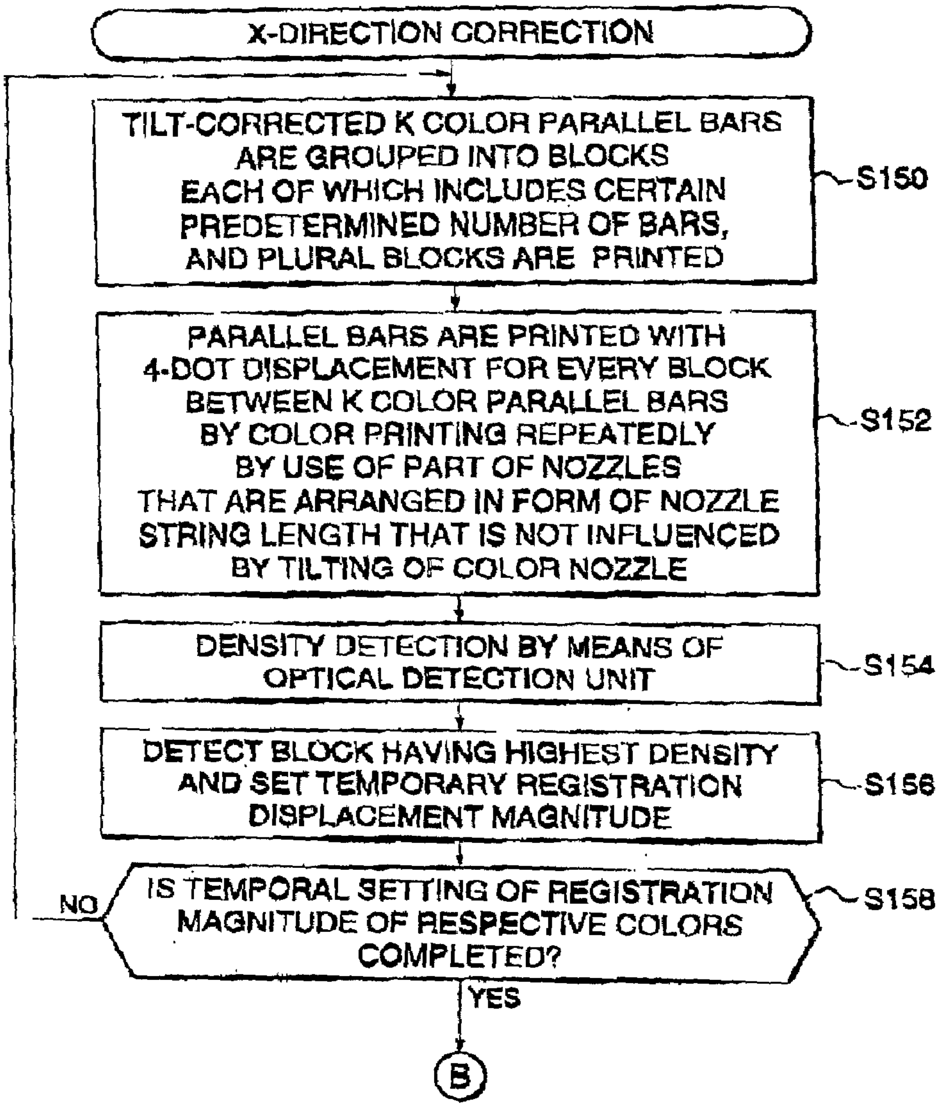
FIGS. 9A and 9B are a flowchart showing the X-direction color registration correction processing.
Figure 9B:
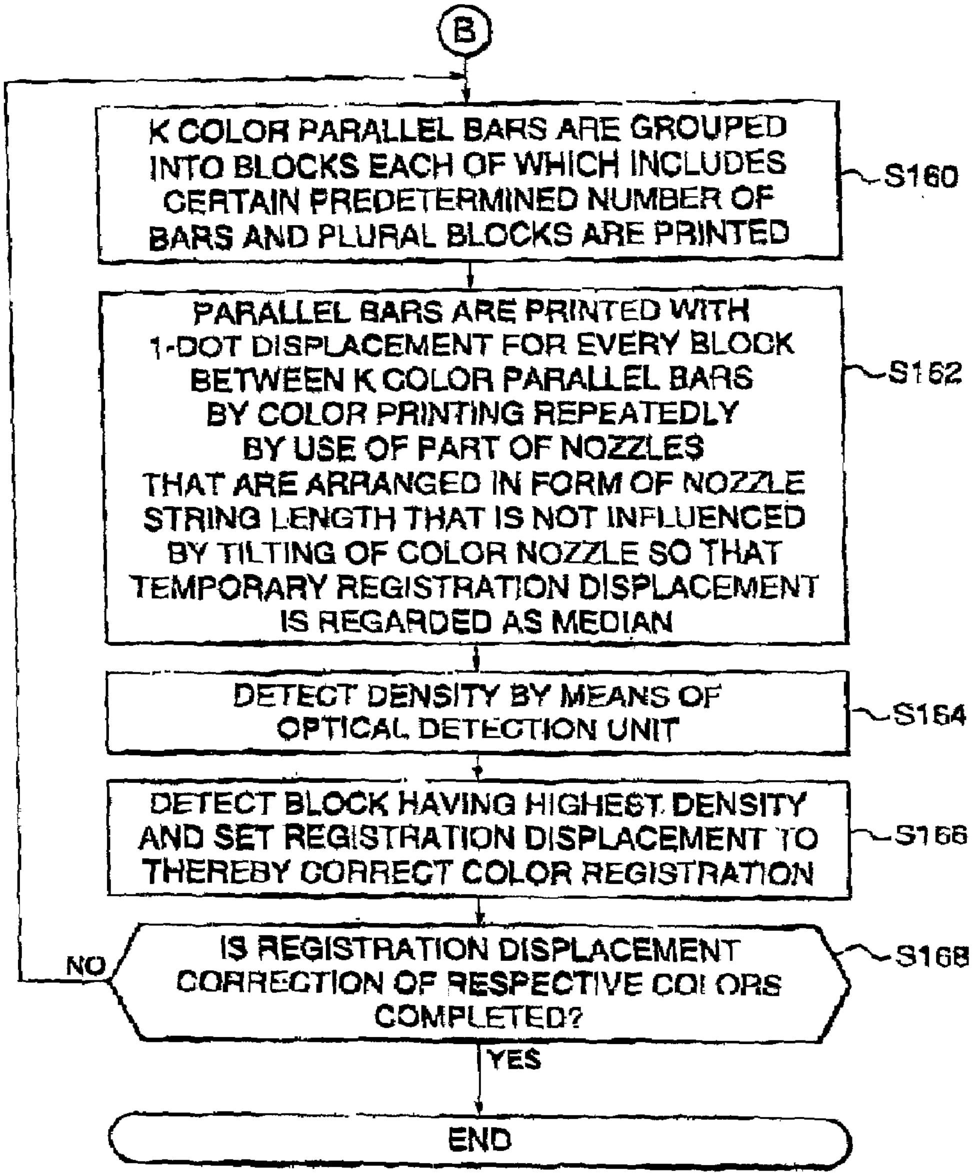

Subsequently, after K color tilt is corrected in step 100 shown in FIG. 5, X-direction color registration is corrected in step 102. The X-direction registration is corrected according to the flowchart shown in FIG. 9A and 9B.

Figure 10:
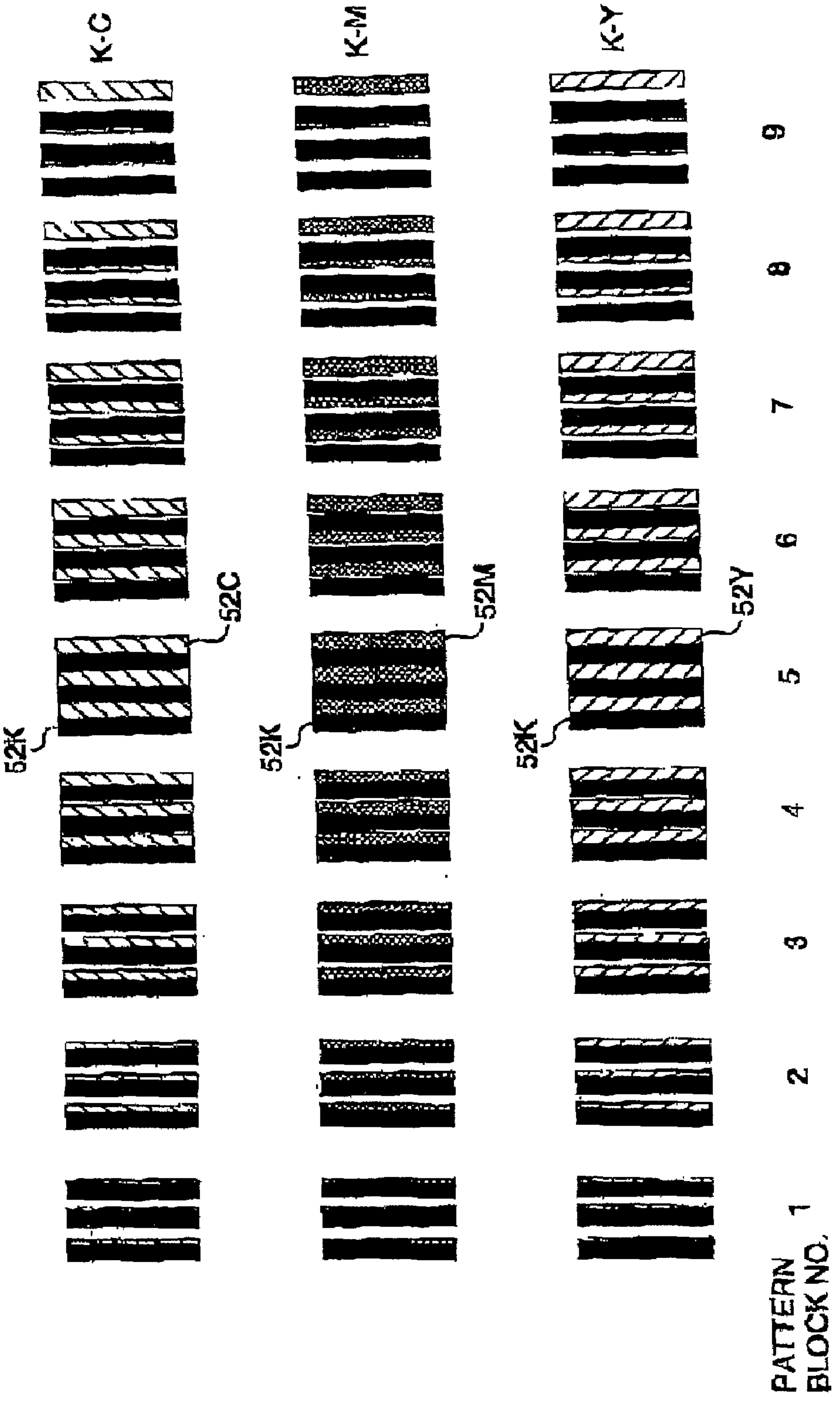
FIG. 10 is a diagram showing the X-direction color registration correction pattern.

In detail, plural blocks each of which includes a certain predetermined number of K color parallel bars 52K that have been subjected to tilt correction in step 100 are printed (step 150), a color (any one of C, M, Y colors) is printed repeatedly by use of a part of nozzles that are to be a nozzle bank length that is not influenced by tilting in the upstream side nozzle of the color printing head 18 (repeated printing in which printing is carried out by use of the above-mentioned part of nozzles and the paper P is moved in Y-direction). Thereby, the parallel bars 52C (or 52M, 52Y) with 4-dot displacement in X-direction for very block are printed between K color parallel bars 52K as shown in FIG. 10 (step 152). Herein, by printing of the color is carried out repeatedly by use of the part of nozzles that are to be the nozzle bank length that is not influenced by the tilting of the upstream side nozzle, the colored parallel bars 52C, 52M, and 52Y are printed without tilt, and as shown in FIG. 10, the parallel bars of K color are approximately parallel to the colored parallel bars of 52C, 52M, and 52Y. Herein, the displacement of each block is 4 dots in the positive direction and the negative direction so that the median is located at the present state, and the span of adjustable range is ±16 dots as shown in FIGS. 8A and 8B.

The optical detection means 22 mounted on the carriage 16 detects the average density of each block (step 154) to detect the block having the highest average density, and the image displacement magnitude of the block is set as the temporary registration displacement magnitude (step 156). At that time, the optical detection unit 22 detects the change of the average density caused by changing the overlap area due to the displacement difference between respective colors and K color.

Whether or not the temporary setting of the registration displacement magnitude of the respective colors has been completed is checked in step 158, processing including from step 150 to step 158 is repeated until a YES result is obtained, and the sequence then proceeds to step 160 when a YES result is obtained.

After the temporary registration displacement magnitude has been set for respective colors, the K color parallel bars are grouped into blocks each of which includes a certain number of bars and plural blocks are printed in block similarly to step 150 (step 160), and a color is printed repeatedly by use of a part of nozzles that are to be a nozzle bank length that is not influenced by tilt of the upstream side nozzle of the color printing head 18. Thereby, the parallel bars 52C with 1 dot displacement in X-direction for very block are printed (step 162). Herein, the displacement of each block is 1 dot in each of the positive and the negative directions so that the median is located at the temporary registration displacement magnitude set in step 156, and the span of adjustable range is ±4 dots as shown in FIGS. 8A and 8B.

The optical detection means 22 mounted on the carriage 16 detects the average density of each block (step 164) to detect the block having the highest average density, and the image displacement magnitude of the block is set as the registration displacement magnitude. By correcting the set registration displacement magnitude when the data is expanded, the color registration in X-direction is corrected (step 166). For example, it is possible to correct the color registration by changing the printing timing correspondingly to the set registration displacement magnitude, or replacing the printing data.

Whether or not the registration displacement correction of the respective colors has been completed is checked in step 168, a series of steps 160 to 168 is repeated until a YES result is obtained, and the color registration correction processing is brought to an end when a YES result is obtained.

As described hereinabove, the X-direction color registration correction processing involves sequential processing in which the rough adjustment for every 4 dots is performed referring to K color tilt that has been corrected as shown in FIGS. 8A and 8B, and the fine adjustment for every 1 dot is performed. In other words, the number of patterns to be recorded on paper can be reduced by correcting the color registration stepwise.

Because blocks of the parallel bars of the respective colors are overlapped on the blocks of the K color parallel bars, a moiré appears due to overlap between the K color vertical line and the parallel bars of color involved in displacement change, and the density change can be detected precisely based on the moiré by means of the optical detection unit. At that time, as the result of the color registration correction with referring to K color that has been subjected to tilt correction, because the part of K color has already been saturated when the density is detected by means of the optical detection unit 22 and the density of the overlapped portions is not increased, the areal gradation effect is obtained without other effects and the density change is detected efficiently. Therefore, it is possible to correct the color registration precisely by correcting color registration of the respective colors with referring to K color that has been subjected to tilt correction.

As the result of employment of K color as the reference, the average density of the recorded pattern is increased, the illuminance of a light source can be increased without saturation of the output of the light receiving element of the optical detection unit 22, it is possible to enlarge the density difference, the density detection accuracy is improved, and the light source having different spectral characteristics is not required. Furthermore, because the color registration is corrected by use of the same reference (tilt-corrected K color) for respective colors, the color registration is corrected precisely.

Though the rough adjustment is performed at first and the fine adjustment is performed thereafter for color registration correction of the respective colors as shown in FIGS. 8A and 8B in the above, the rough adjustment and fine adjustment may be performed for each color (CMY) as in the case of the tilt correction processing performed by use of K color as the reference as described hereinafter.

Figure 11:
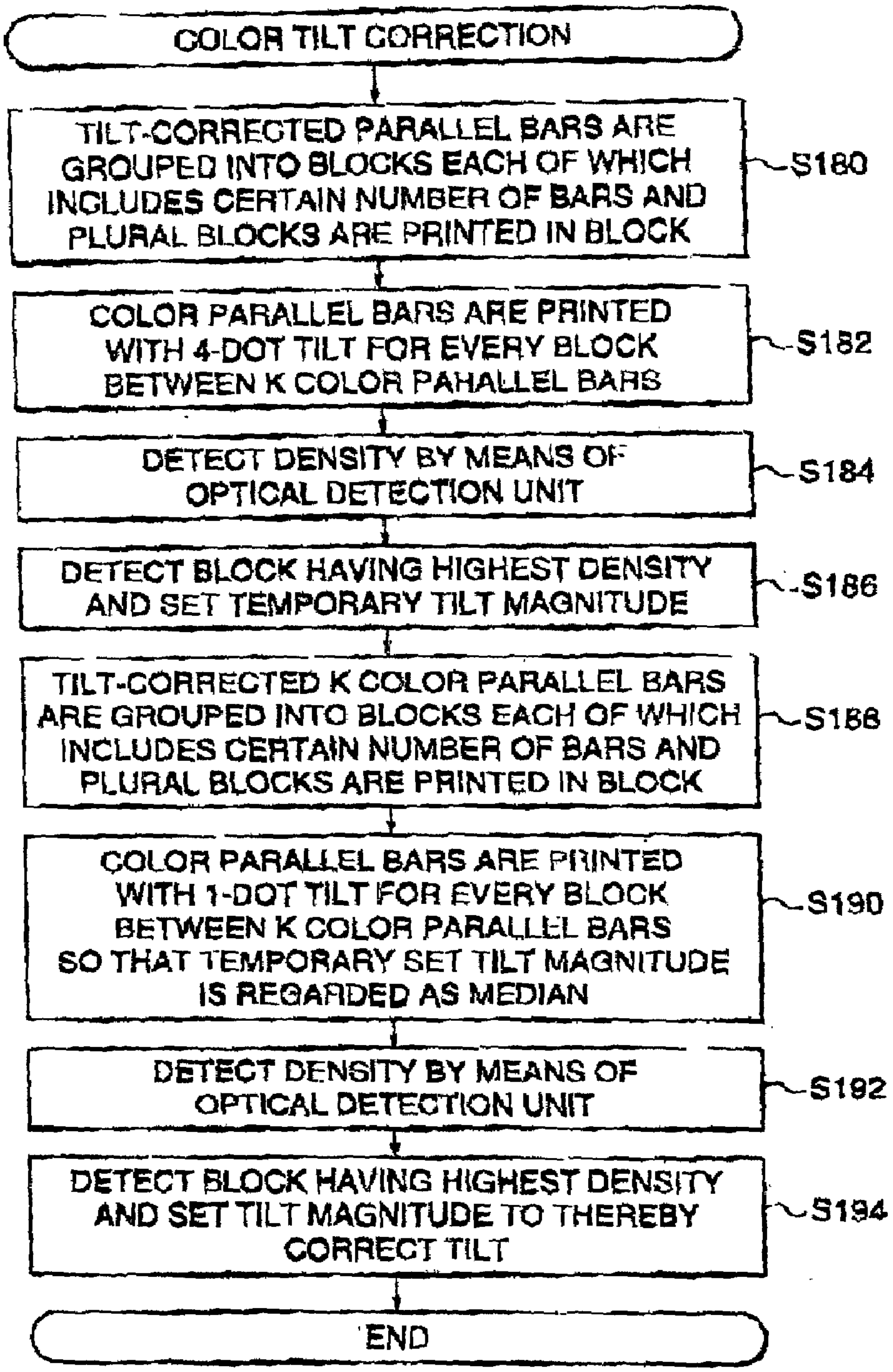
FIG. 11 is a flowchart showing the color tilt correction processing.

Subsequently, after X-direction color registration is corrected in step 102 shown in FIG. 5, the tilt of each color is corrected with referring to K color as reference in step 104. The tilt correction of each color is performed according to the flowchart shown in FIG. 11.

Figure 12:
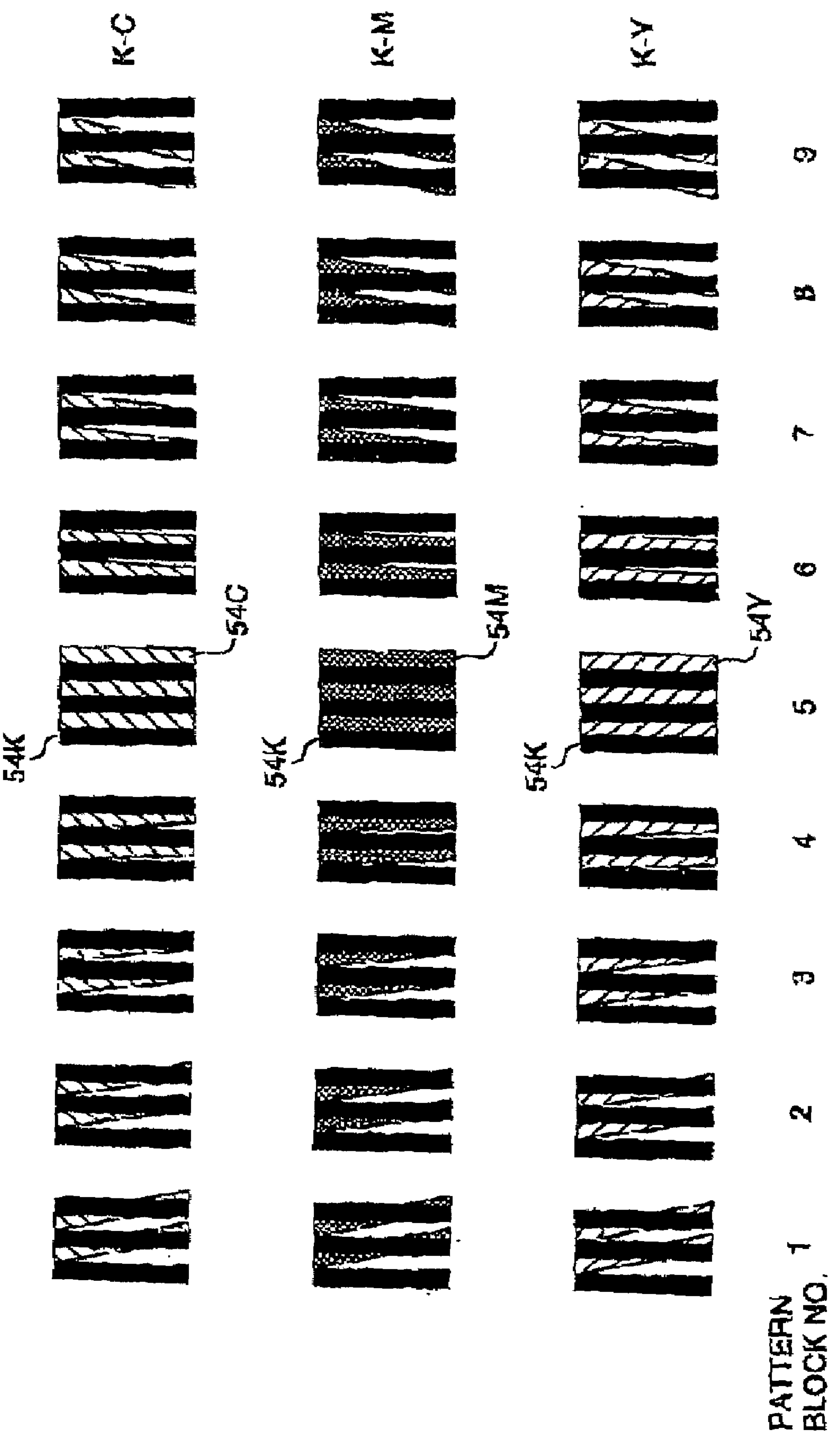
FIG. 12 is a diagram showing the color tilt correction pattern.

In detail, K color parallel bars 54K that have been subjected to tilt correction in step 100 is grouped into blocks each of which includes a certain number of bars and plural blocks are printed (step 180), the color parallel bars 54C (or 54M, or 54Y) are printed with 4-dot tilt for every block between K color parallel bars 54K (step 182). Each block is tilted with 4 dots in the positive and negative directions from the median that is located at the present state, and the span of adjustable range is ±16 dots as shown in FIGS. 8A and 8B. In other words, the blocks of the color parallel bars 54C (or 54M or 54Y) with 4-dot tilt are printed on the blocks of K color parallel bars 54 without tilt with overlap as shown in FIG. 12. The respective print patterns of K color and C color, K color and M color, and K color and Y color are shown in FIG. 12.

The optical detection unit 22 mounted on the carriage 16 detects the density of each block (step 184), the block having the highest average density is detected, and the tilt magnitude of the color of the block is set as a temporary tilt magnitude (step 186). The optical detection unit 22 detects the change of average density of a block formed due to the parallel bar overlap area change based on the difference of inclination of each color from the inclination of K color.

Furthermore, as in the case of step 180, the K color parallel bars 54K are grouped into blocks each of which includes a certain predetermined number of bars and plural blocks are printed in block (step 188), and the color parallel bars 54C (or 54M or 54Y) are printed with 1-dot tilt for every block between the K color parallel bars 54K (step 190). Each block is tilted in the positive and negative direction with 1-dot tilt so that the temporary tilt magnitude set in step 186 is located at the median, and the span of adjustable range is ±4 dots as shown in FIGS. 8A and 8B.

The optical detection unit 22 mounted on the carriage 16 detects the density of each block (step 192), the block having the highest average density is detected, and the tilt magnitude of the color of the block is set as the tilt magnitude of the color. The color tilt correction is performed by correcting the tilt by the magnitude that is equivalent to the set tilt magnitude when the data is expanded (step 194). For example, it is possible to correct the tilt of the color by changing the printing timing correspondingly to the set tilt magnitude or replacing the print data.

Though the color tilt is corrected for each color (CMY) by performing the above-mentioned processing, otherwise a method in which the rough adjustment is performed for the respective colors and the fine adjustment is then performed for the respective colors may be employed as in the case of X-direction color registration correction processing.

As described hereinabove, in the tilt correction of the color in the present embodiment, a method in which the rough adjustment is performed every 4 dots with referring to the tilt-corrected K color and the fine adjustment is performed every 1 dot thereafter as shown in FIGS. 8A and 8B is employed for the tilt correction of the color. In other words, tilt correction of the color is performed stepwise to reduce the number of patterns to be recorded on paper P.

Figure 6A:
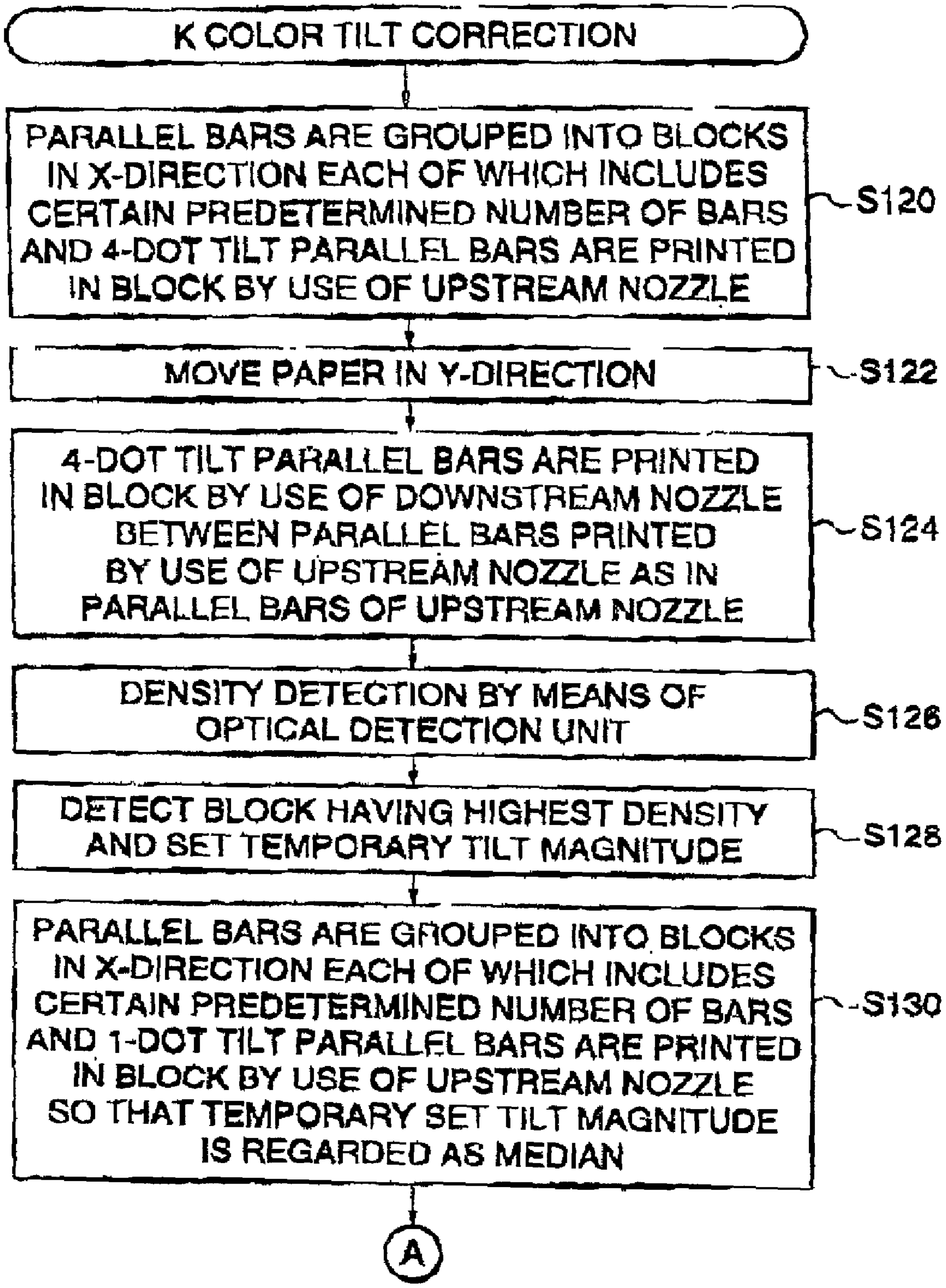
FIGS. 6A and 6B are a flowchart showing the K color tilt correction processing.
Figure 6B:
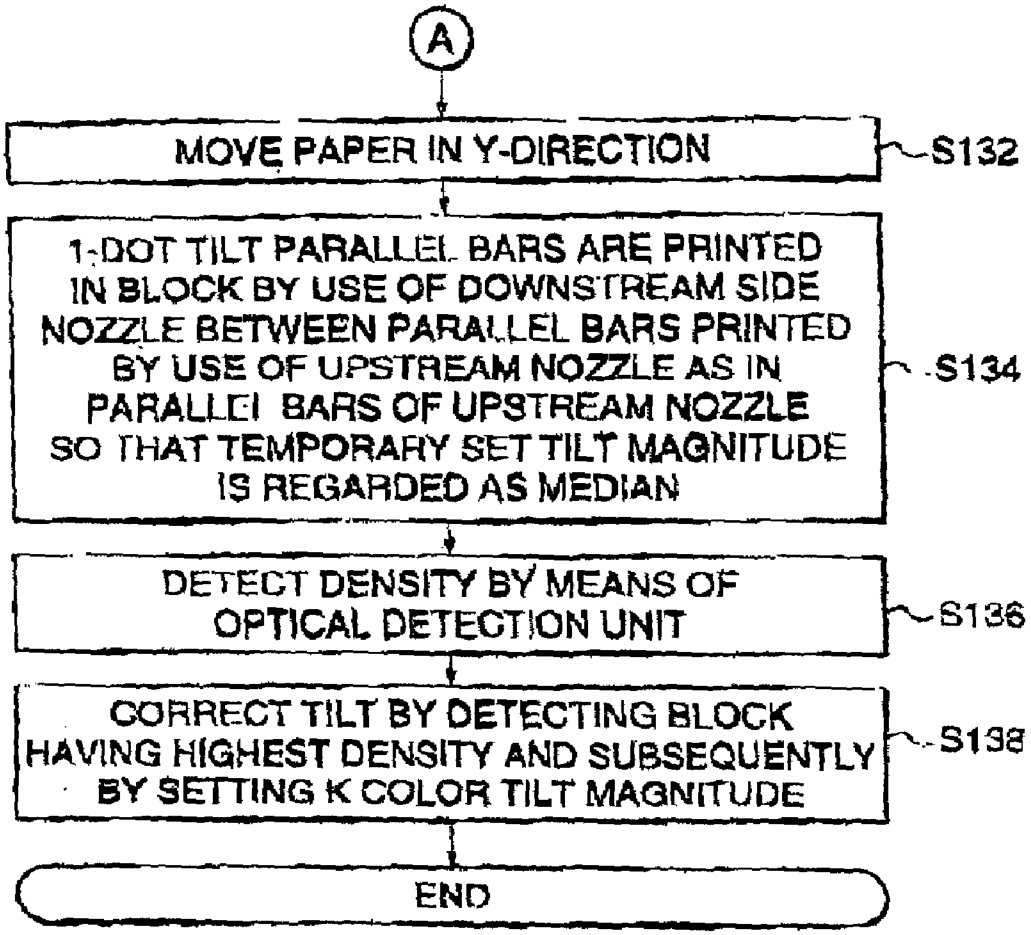
Figure 13:
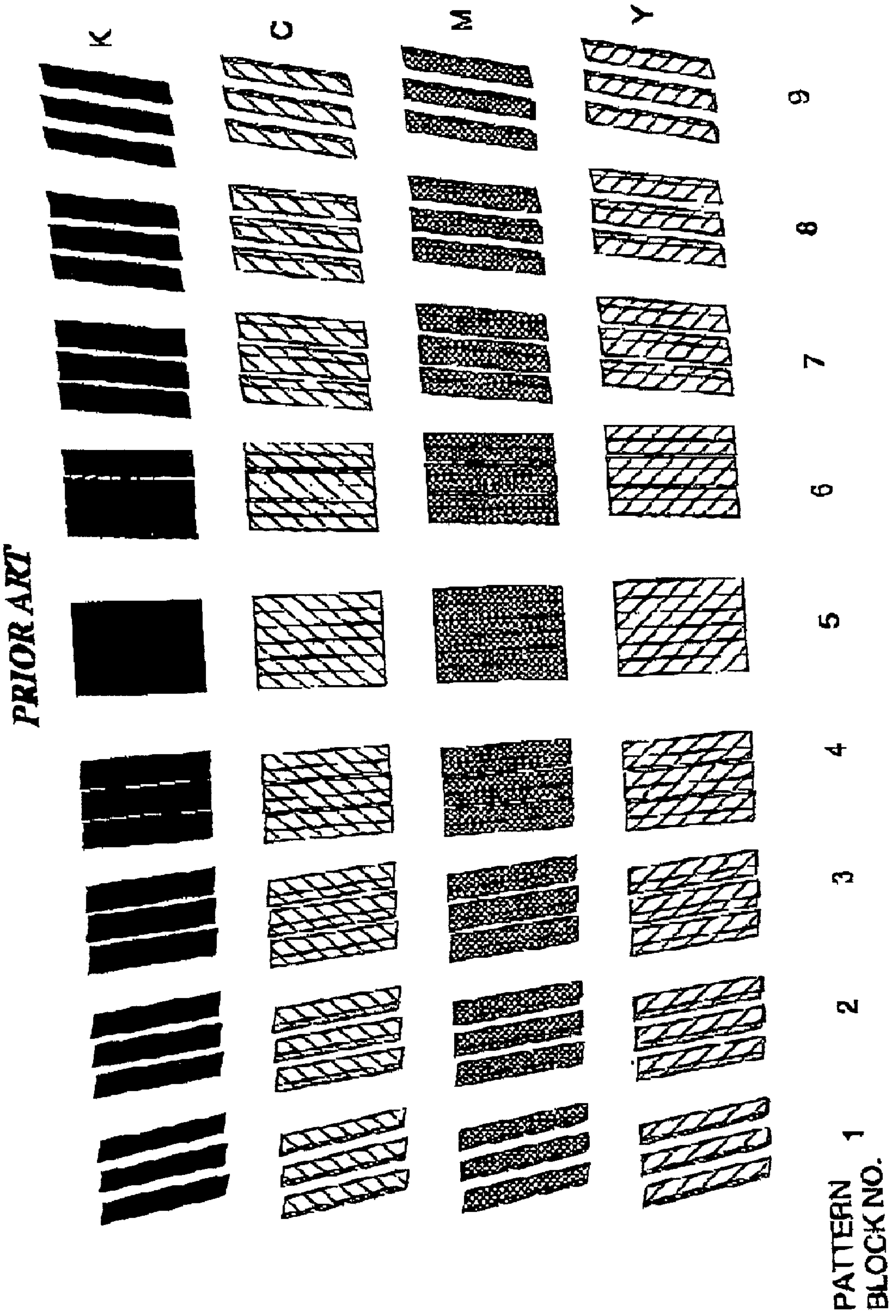
FIG. 13 PRIOR ART
FIG. 13 is a diagram showing the conventional color tilt correction pattern.
Figure 14:
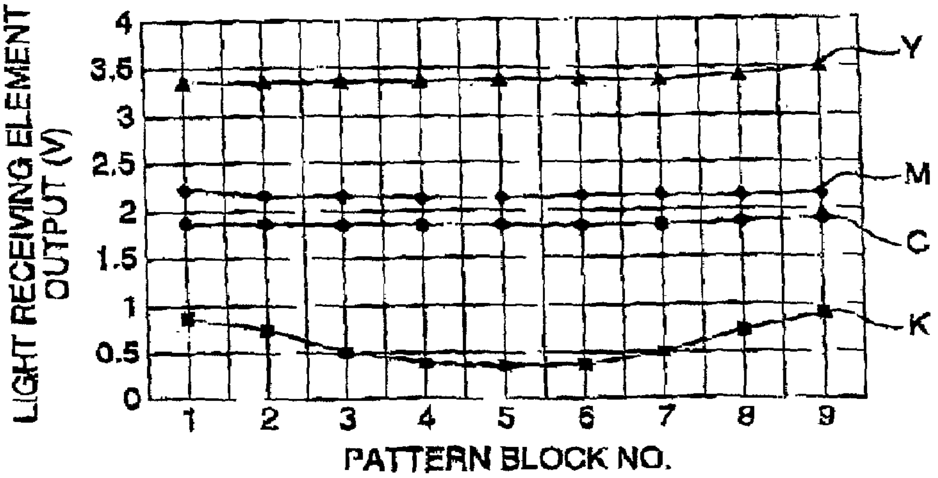
FIG. 14 PRIOR ART
FIG. 14 is a diagram showing the detection output of the conventional color tilt correction pattern detected by means of the optical detection unit.
Figure 15:
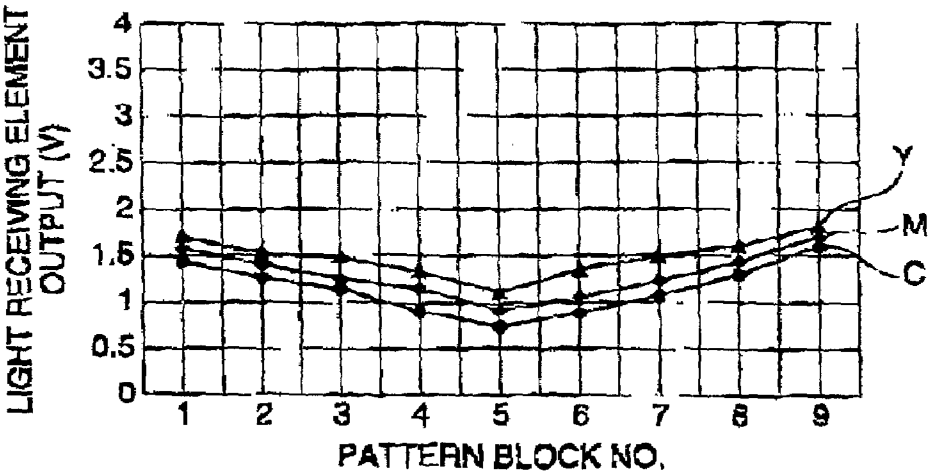
FIG. 15 is a diagram showing the detection output of the color tilt correction pattern in the present embodiment detected by means of the optical detection unit.

Aside from the present invention, in the case where the tilt is corrected by use of the monochrome pattern as in the case of the conventional method, the monochrome pattern is formed for the respective colors by use of the upstream nozzle and the downstream nozzle as shown in FIG. 13 in the same manner as used for tilt correction of K color (flowchart shown in FIGS. 6A and 6B). In this case, when the optical detection unit 22 detects the density of each block, the output of the light receiving element of the optical detection unit is larger as shown in FIG. 14, and it is difficult to detect the density change of Y color. On the other hand, in the present embodiment, because blocks of the parallel bars of the respective colors are overlapped on the block of K color parallel bars as described hereinabove, a moiré is generated due to overlapping between the vertical line of K color and the parallel bars of the color, the inclination of which changes, and the optical detection unit detects the density change precisely based on the moiré. At that time, the tilt of the respective colors is corrected with referring to K color that has already been subjected to tilt correction and the density of K color portion has been saturated when the optical detection unit 22 detects the density, and the density of overlap portion is not increased. As the result, the areal gradation effect is obtained without other effects, and approximately the same output intensity is obtained for the respective colors as shown in FIG. 15 and the density change is detected efficiently. Therefore, the tilt of the color is corrected precisely. The pattern block No. on the abscissa shown in FIG. 14 and FIG. 15 corresponds to the pattern block No. shown in FIG. 12 and FIG. 13.

The average density of the recorded pattern is increased by employing K color as the reference, the output of the light receiving element of the optical detection unit 22 does not saturate even though the luminance of the light source is increased, it is possible to enlarge the density difference, the density detection accuracy is improved, and the light source having different spectral characteristics is not required. Furthermore, because the tilt of the color is corrected by use of the same reference for the respective colors (tilt-corrected K color), the tilt of the color is corrected precisely.

Furthermore, because the optical detection unit 22 is disposed at the position located on the downstream side in the paper P feeding direction of the carriage 16 in the present embodiment, the optical detection unit 22 detects the pattern immediately after the pattern is printed, and as shown in FIG. 12, the position where the influence due to the tilt of printing heads of the respective colors is largest (position on the downstream side in Y-direction) is detected. As the result, the density change is detected precisely.

Furthermore, because it is not necessary to feed paper when the pattern of the color is recorded after the pattern of K color is recorded, the time required for pattern forming is shortened.

Figure 16:
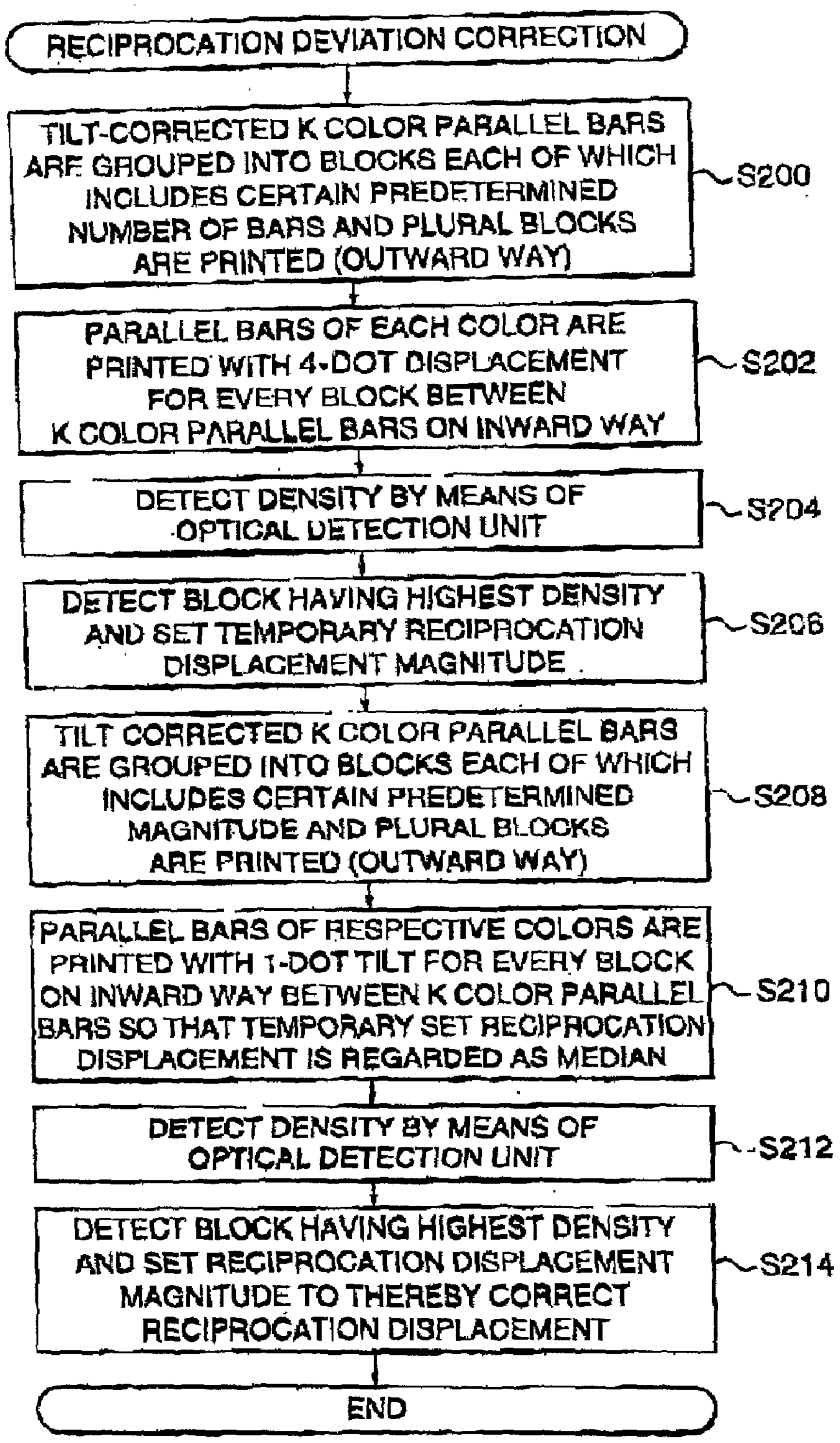
FIG. 16 is a flowchart showing the reciprocation displacement correction processing.

Subsequently, after the tilt of the respective colors is corrected with referring to K color in step 104 shown in FIG. 5, X-direction reciprocating print correction processing is performed with referring to K color on the outward way in step 106. The X-direction reciprocating print correction is performed according to the flowchart shown in FIG. 16.

In detail, the K color parallel bars that are subjected to the tilt correction in step 100 are grouped into blocks each of which includes a certain number of bars, and plural blocks are printed on the outward way of the carriage 16 in block (step 200), and the parallel bars of the respective colors (KCMY) are printed with 4-dot displacement for every block between the K color parallel bars on the inward way of the carriage 16 (step 202). In other words, the same pattern as that for X-direction color correction shown in FIG. 10 is printed. The displacement is recorded with 4 dots for every block in each of the positive and negative directions so that the median is located at the present state, and the span of adjustable range is ±16 dots as shown in FIGS. 8A and 8B.

The optical detection unit 22 mounted on the carriage 16 detects the density of each block (step 204), the block having the highest average density is detected, and the image displacement magnitude of the block is set as the temporary reciprocation displacement (step 206). At that time, the optical detection unit 22 detects change of the average density arising from change of the overlap area due to the difference in the displacement between the respective colors and K color.

Furthermore, as in step 200, the K color parallel bars are grouped into blocks each of which includes a certain predetermined number of bars, plural blocks are printed on the outward way of the carriage 16 (step 208), and the parallel bars of the respective colors (KCMY) are printed on the inward way of the carriage 16 with 1-dot displacement for every block between the K color parallel bars (step 210). Herein, the displacement between adjacent blocks is set with 1-dot displacement in each of the positive and negative directions so that the reciprocation displacement magnitude set in step 206 is regarded as the median, and the span of adjustable range is ±4 dots as shown in FIGS. 8A and 8B.

The optical detection unit 22 mounted on the carriage 16 detects the density of each block (step 212), the block having the smallest density change is detected, and the reciprocation displacement of the block is set as the reciprocation displacement magnitude arising from the reciprocation of the carriage 16. Then, the reciprocation displacement is corrected by correcting when the magnitude equivalent to the data of the set reciprocation displacement magnitude is expanded (step 214). For example, it is possible to correct the reciprocation displacement correction by changing the printing timing corresponding to the set reciprocation displacement magnitude or replacing the printing data.

Though the reciprocation displacement is corrected by performing the above-mentioned processing for every respective colors (KCMY), a method in which the rough adjustment is carried out for each color at first and the fine adjustment is carried out for each color may be employed as in the case of X-direction color registration correction processing.

Because the blocks of the parallel bars of each color are overlapped on the blocks of K color parallel bars, the overlap of K color vertical lines and the displacement changing color parallel bars form a moiré, and the optical detection unit can detect the average precisely based on the moiré.

Figure 17:
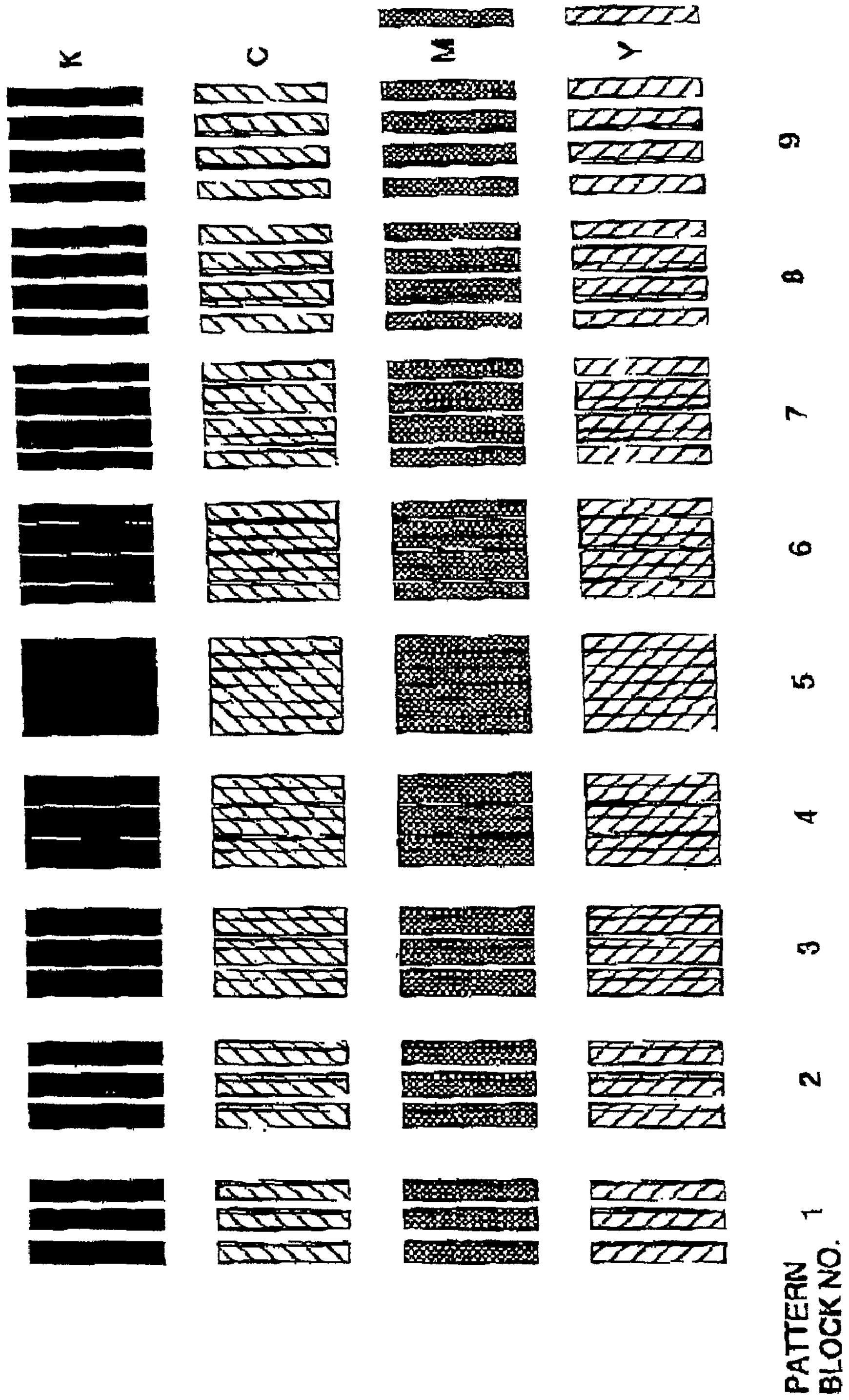
FIG. 17 PRIOR ART
FIG. 17 is a diagram showing the conventional reciprocation displacement correction pattern.
Figure 18:
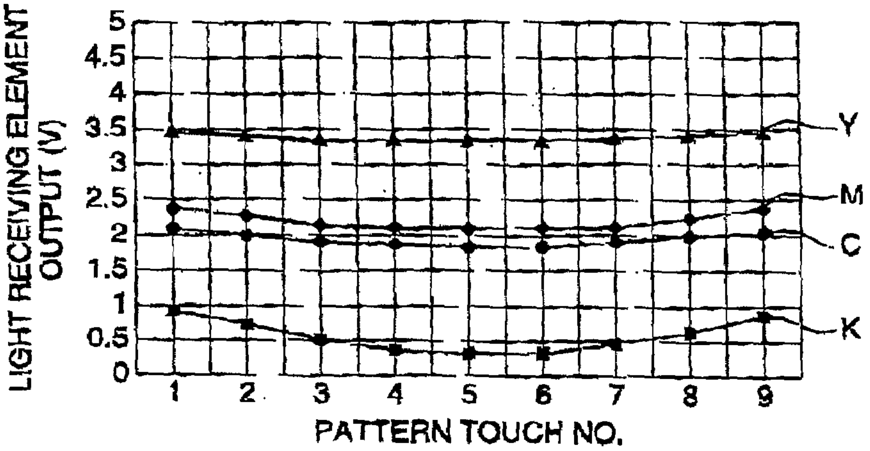
FIG. 18 PRIOR ART
FIG. 18 is a diagram showing the detection output of the conventional reciprocation displacement correction pattern detected by means of the optical detection unit.
Figure 19:
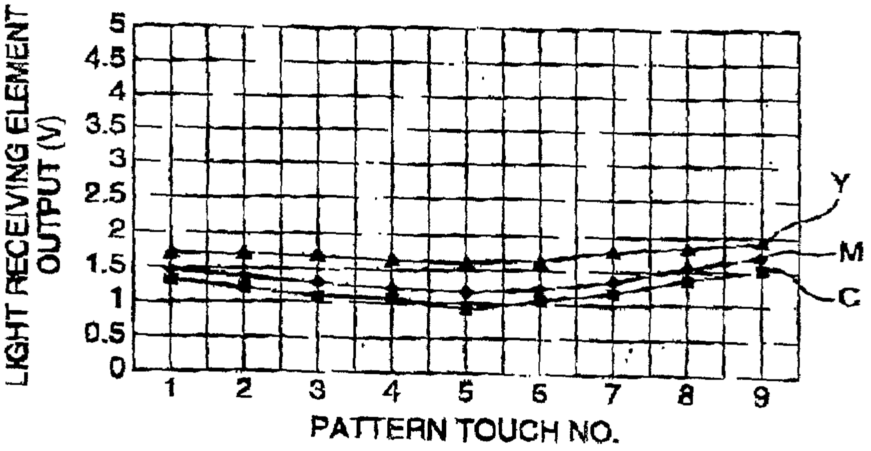
FIG. 19 is a diagram showing the detection output of the reciprocation displacement correction pattern used in the present embodiment detected by means of the optical detection unit.

In the conventional case where the reciprocation displacement is corrected by use of the monochrome pattern, the monochrome patterns are formed with slight displacement so that the blocks of the parallel bars printed on the inward way overlap thereon between the parallel bars printed on the outward way as shown in FIG. 17, the light receiving element output of the optical detection unit 22 becomes large when the optical detection unit 22 detects the density as shown in FIG. 18, and it is difficult to detect the Y-color density change in this case. On the other hand, in the case of the present embodiment, because the blocks of the parallel bars of each color is overlapped on the blocks of the K-color parallel bars as described hereinabove, the overlap of the K color vertical line on the color parallel bars printed with changing displacement causes a moiré, and the optical detection unit detects the density change precisely based on the moiré. At that time, because the reciprocation displacement is corrected with reference to the tilt-corrected K color recorded on the outward way, the density of K color portion has already been saturated and the density of the overlap portion is not increased when the optical detection unit 22 detects the density. As the result, the pure areal gradation effect is obtained and the density change is detected efficiently as shown in FIG. 19. Therefore, the reciprocation displacement of each color is corrected precisely by correcting the reciprocation displacement of each color with reference to the tilt-corrected K color recorded on the outward way.

Figure 20:
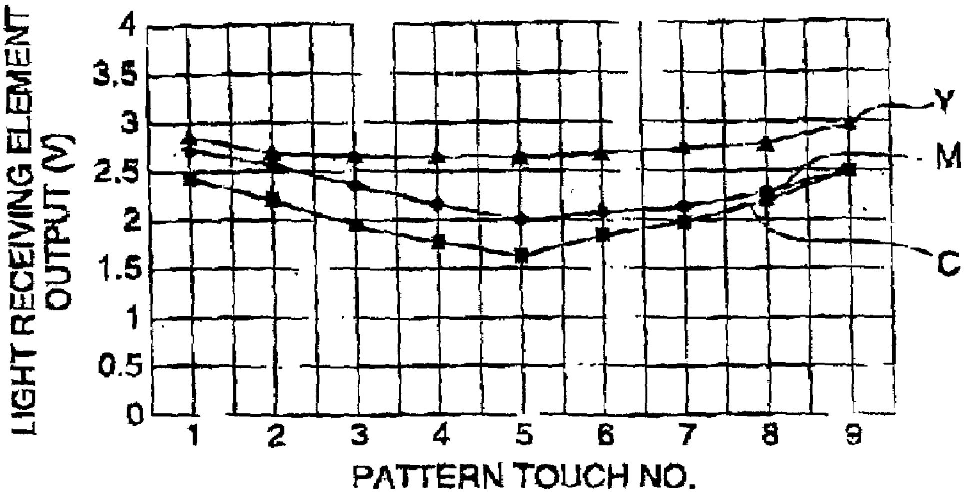
FIG. 20 is a diagram showing the detection output of the reciprocation displacement correction pattern used in the present embodiment detected by means of the optical detection unit under the condition of increased luminance (approximately double luminance in comparison with that shown in FIG. 19)

Because the average density of the recorded pattern is increased by employing K color as the reference, the output of the light receiving element of the optical detection unit 22 will not be saturated even if the luminance of the light source is increased as shown in FIG. 20, it is possible to enlarge the density difference, the density detection precision is improved, and a light source having different spectral characteristics is not necessary. Furthermore, because the reciprocation displacement is corrected by use of the same reference on both outward way and inward way of each color (tilt-corrected K color recording on the outward way), the reciprocation displacement is corrected precisely.

Figure 5:
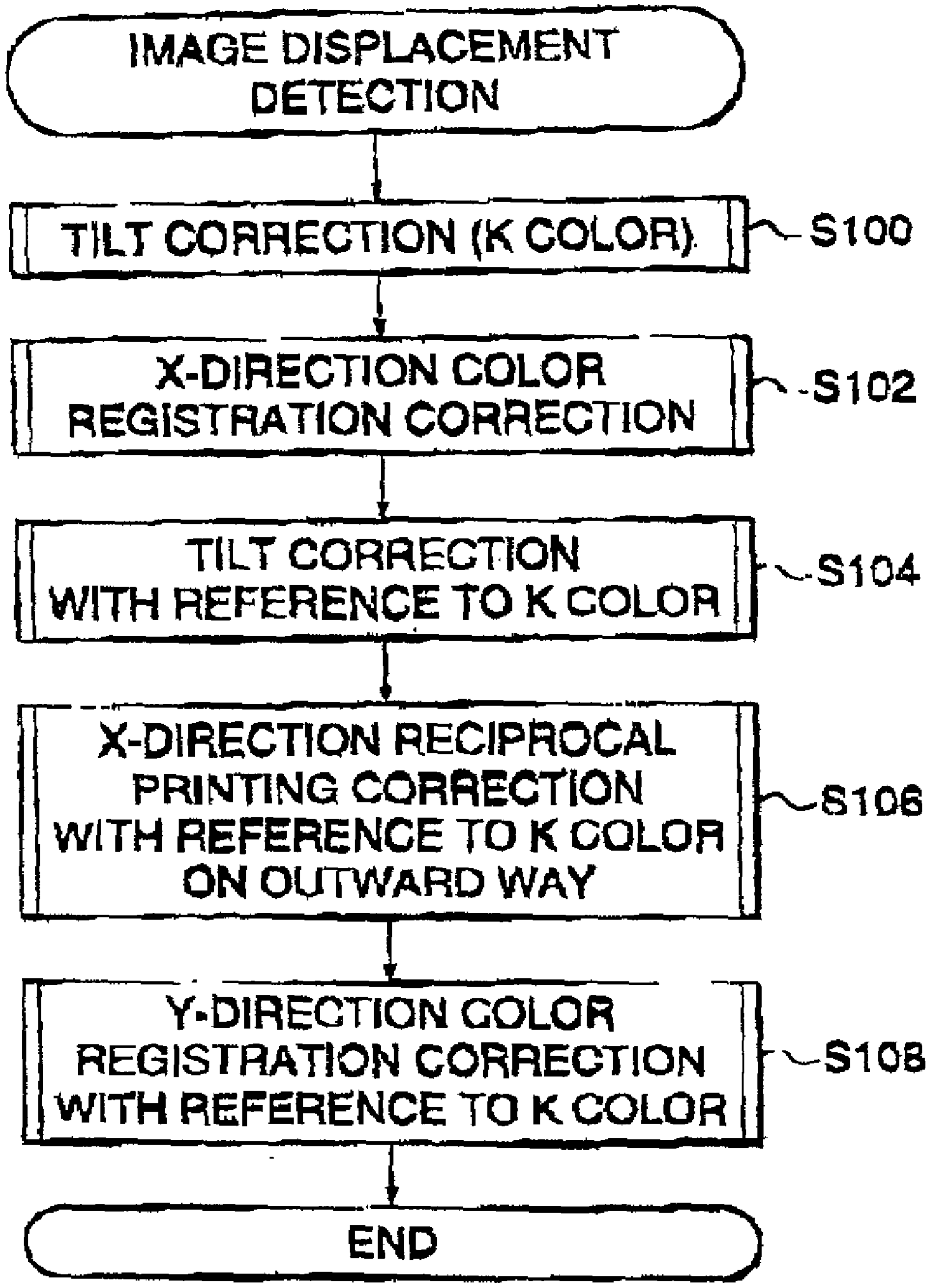
FIG. 5 is a flowchart showing the image displacement detection adjustment.
Figure 21:
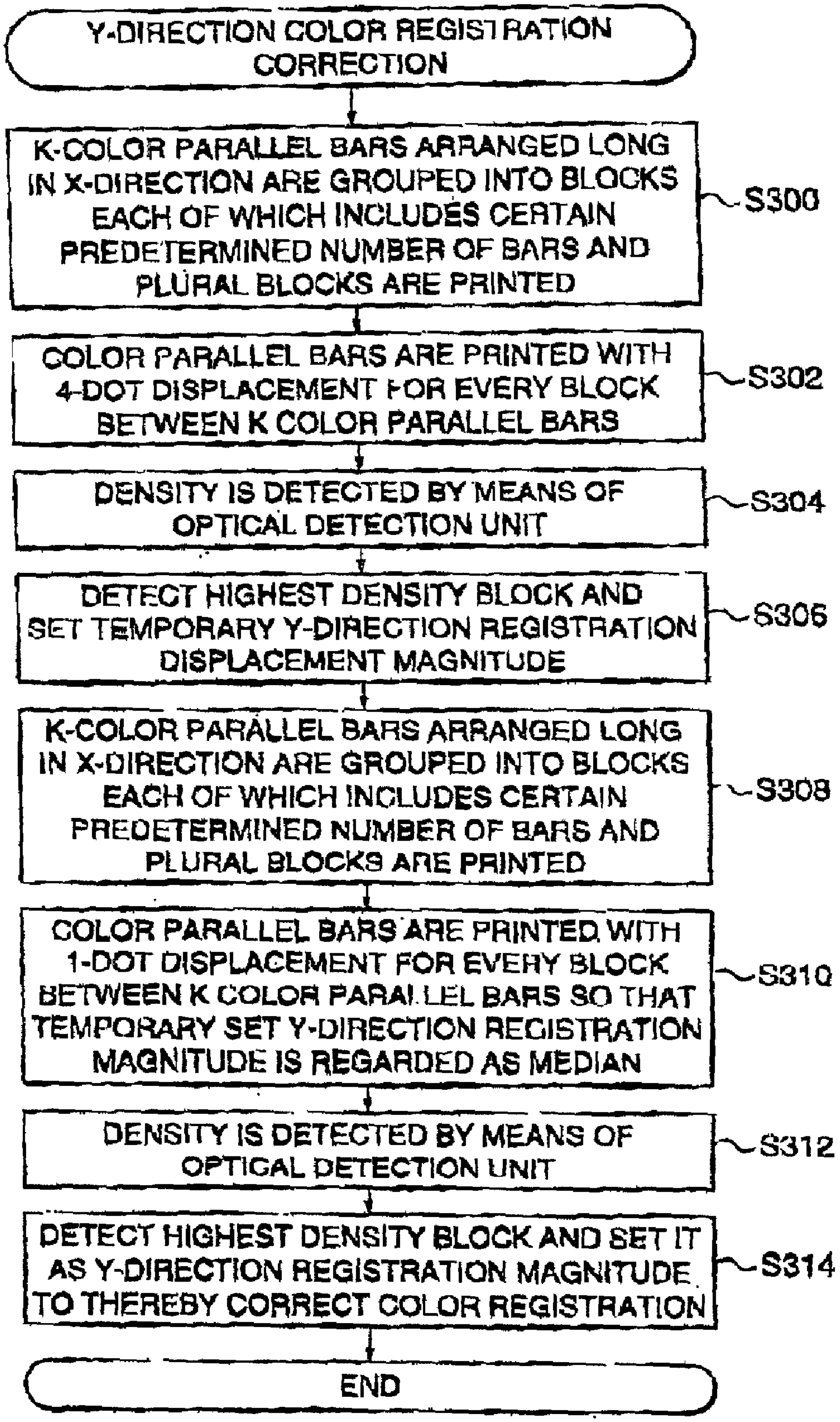
FIG. 21 is a flowchart showing the Y-direction color registration correction processing.

When the K color reciprocation printing is corrected with reference to K color on the outward way in step 106 shown in FIG. 5, the Y-direction color registration is corrected with reference to K color in step 108. The Y-direction color registration is corrected according to the flowchart shown in FIG. 21.

In detail, the tilt-corrected K color parallel bars are grouped into blocks each of which includes a certain number of bars in step 100, and plural blocks are printed (step 300). Though a block including parallel bars arranged in the Y-direction is printed in the above-mentioned processing (steps 100 to 106), plural blocks of the parallel bars each of which block including the parallel bars arranged long in X-direction are printed. The color parallel bars are printed with 4-dot displacement in Y-direction for every block between the K color parallel bars (step 302). Every block is displaced 4 dots in each of the positive and negative directions so that the present state is located at the median, and the span of adjustable range is ±16 as shown in FIGS. 8A and 8B.

The optical detection unit 22 mounted on the carriage 16 detects the density of each block (step 304), the block having the highest average density is detected, and the image displacement magnitude of the block is set as the temporary registration displacement magnitude of the block (step 306). Herein, the optical detection unit 22 detects the average density change caused by changing of overlapping area due to the difference of each color with respect to K color.

Furthermore, as in step 300, the K color parallel bars are grouped into blocks each of which includes a certain number of bars as in the case of step 300 and plural blocks are printed (step 308), and the color parallel bars are printed with 1-dot displacement for every block between the K color parallel bars (step 310). The blocks are printed with 1-dot displacement in each of the positive and negative directions so that the registration displacement magnitude set in step 308 is located at the median, and the span of adjustable range is ±4 dots as shown in FIGS. 8A and 8B.

The optical detection unit 22 mounted on the carriage 16 detects the density of each block (step 312), the block having the highest average density is detected, and the image displacement magnitude of the block is set as the registration displacement magnitude. The Y-direction color registration is corrected by correcting it when the data equivalent to the set registration displacement magnitude is expanded (step 314). For example, it is possible to correct the color registration by selecting the nozzle to be used or replacing the print data.

The color tilt is corrected by means of the above-mentioned processing for the respective colors (CMY), but a method in which the rough adjustment of each color is performed and then the fine adjustment of each color is performed may be employed as in the case of the X-direction color registration correction processing.

The color displacement of each color is corrected with reference to K color also for the Y-direction color displacement correction as described hereinabove, and the image displacement detection adjustment processing is brought to an end.

Though the density printed when the parallel bars of K color and colors are recorded is not mentioned in the image displacement detection adjustment processing in the above-mentioned embodiment, the density of the respective parallel bars may be 100%, or may be different for each processing.

Though the parallel bars are printed in block and are printed so that the tilt magnitude and displacement magnitude are different for every block in each process of the image displacement detection processing in the above-mentioned embodiment, a method may be employed in which the parallel bars are printed not in block unit but printed in parallel bars so that the tilt magnitude and displacement magnitude are different for every parallel bars.

According to the above-mentioned present invention, plural reference parallel bars are recorded on a recording medium by use of the reference recording head and plural parallel bars that are inclined differently are recorded between the recorded plural reference parallel bars by use of another recording head so as to overlap to thereby detect the inclination of the image to be recorded by another recording head with respect to the inclination of the image recorded by the reference recording head. As the result, the inclination of the image recorded by the reference recording head is matched precisely with the inclination of the image to be recorded by another recording head, and it is possible to correct the recording position correctly.

Furthermore, by correcting the inclination of the reference recording head previously, it becomes possible to correct the inclination of all the recording heads correctly.

While preferred embodiments have been shown and described, various modifications and substitutions may be made thereto without departing from the spirit and scope of the invention. Accordingly, it is to be understood that the present invention has been described by way of illustration and not limitation.

The entire disclosure of Japanese Patent Application No. 2001-228638 filed on Jul. 27, 2001 including specification, claims, drawings and abstract is incorporated herein by reference in its entirety.

What is claimed is:

1. A recording position adjusting pattern forming method for adjusting a recording position of plural printing heads, each head having a different color, for recording a color image on a recording medium, the method comprising:

assigning a first recording head of the plural recording heads as a reference recording head;

recording plural reference parallel bars on the recording medium with the reference recording head;

recording plural bars on the recording medium with a second recording head of the plural recording heads, the plural bars overlapping the plural reference parallel bars to form a recording position adjusting pattern and including at least two bars with different inclination relative to each other.

2. The method of claim 1 further comprising adjusting an inclination of the reference parallel bars which is due to inclination of the reference recording head.

3. The method of claim 1 wherein the plural bars have different inclinations respectively.

4. The method of claim 1 wherein the plural reference parallel bars comprise a first set of plural reference pattern blocks and the plural bars comprise a second set of plural pattern blocks.

5. The method of claim 4 wherein the plural bars of the second set of plural pattern blocks have different inclinations between each block.

6. The method of claim 1 wherein the reference recording head is a black recording head for recording a black image.

7. The method of claim 1 further comprising:

adjusting an inclination of the reference parallel bars which is due to inclination of the reference recording head;

adjusting a recording position in a scanning direction of a recording head between the respective recoding heads of the plural recording heads; and subsequently adjusting a recording position due to inclination caused between the plural recording heads by use of the recording position adjusting pattern.

8. An image recording apparatus comprising:

plural recording heads for recording images of different colors respectively on a recording medium, a recording control unit that controls a reference recording head having a reference color of the plural recording heads to record plural reference parallel bars on the recording medium, and controls a recording head other than the reference recording head to record plural bars on the recording medium, the plural bars including at least two bars with different inclination relative to each other and each of the two bars being recorded between adjacent bars of the reference parallel bars to thereby record a recording position adjusting pattern on the recording medium, an optical detection unit that optically detects the recording position adjusting pattern recorded by means of the recording control unit, and a recording timing adjusting unit that adjusts a recording timing of the plural recording heads of the recording control unit based on a detected output of the optical detection unit.

9. The image recording apparatus according to claim 8, wherein the reference recording head is a black recording head for recording a black image.

10. The image recording apparatus according to claim 8, wherein the optical detection unit detects the recording position adjusting pattern on a downstream side of a recording direction in a direction that intersects with a scanning direction of the plural recording heads.

11. The image recording apparatus according to claim 8, wherein the image recording apparatus is provided with an operation starting instruction unit and an automatic execution control unit that automatically operates the recording control unit, the optical detection unit, and a recording timing adjusting unit based on an operation starting instruction supplied from the operation starting instruction unit.

12. A recording position adjusting pattern forming method comprising:

recording plural reference parallel bars on a recording medium by use of a first recording head of a color that is predetermined previously among independent recording heads of plural colors that are used to record a color image on the recording medium, and recording plural bars by use of a second recording head of the independent recording heads, the plural bars including at least two bars with different inclination relative to each other and each of the two bars being recorded between adjacent bars of the reference parallel bars.

13. A detection method for detecting a recording position adjusting pattern comprising:

recording plural reference parallel bars on a recording medium by use of a first recording head of a color that is predetermined previously among independent recording heads of plural colors that are used to record a color image on the recording medium, recording plural bars by use of a second recording head of the independent recording heads, the plural bars including at least two bars with different inclination relative to each other and each of the two bars being recorded between adjacent bars of the reference parallel bars, and detecting the recorded parallel bars optically.

14. The detection method according to claim 13, wherein the optical detection involves detection of a reflected density of the parallel bars.

15. An alignment method for aligning plural recording heads comprising:

recording plural reference parallel bars on a recording medium by use of a first recording head of a color that is predetermined previously among independent recording heads of plural colors that are used to record a color image on the recording medium, recording plural bars by use of a second recording head of the independent recording heads, the plural bars including at least two bars with different inclination relative to each other and each of the two bars being recorded between adjacent bars of the reference parallel bars, detecting the recorded parallel bars optically, and adjusting a recording timing of the recording head based on the detection result.

16. The alignment method according to claim 15, wherein the recording of the reference parallel bars, the recording of the plural bars with different inclination, the optical detection, and the recording timing adjustment are executed automatically.

17. An image recording apparatus provided with an auto-alignment mode for automatically executing an operation comprising:

independent recording heads of plural colors that are used to record a color image on a recording medium, the independent recording heads including, a first recording head of a color that is predetermined previously among the independent recording heads, whereby plural reference parallel bars are recorded on a recording medium by use of the first recording head, and a second recording head, whereby plural bars are recorded, the plural bars including at least two bars with different inclination relative to each other and each of the two bars being recorded between adjacent bars of the reference parallel bars, and an optical device for detecting the recorded parallel bars optically, whereby a recording timing of the second recording head is adjusted based on a detection output signal from the optical device.

18. The alignment method according to claim 15 further comprising:

adjusting a recording position between the plural recording heads in the horizontal direction and vertical direction with respect to a carriage moving direction, and adjusting a recording position concomitant with reciprocation printing of carriage movement.

* * * * *